(12) United States Patent
Sase et al.

(10) Patent No.: US 11,906,431 B2
(45) Date of Patent: Feb. 20, 2024

(54) MICROSCOPE APPARATUS

(71) Applicant: NIKON CORPORATION, Tokyo (JP)

(72) Inventors: Ichiro Sase, Yokohama (JP); Yasutoshi Kaneko, Yokohama (JP); Tatsuo Fukui, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 321 days.

(21) Appl. No.: 17/178,957

(22) Filed: Feb. 18, 2021

(65) Prior Publication Data

US 2021/0172877 A1 Jun. 10, 2021

Related U.S. Application Data

(60) Division of application No. 15/991,426, filed on May 29, 2018, now abandoned, which is a continuation of
(Continued)

(51) Int. Cl.
*G02B 21/36* (2006.01)
*G02B 21/16* (2006.01)
(Continued)

(52) U.S. Cl.
CPC ......... *G01N 21/6458* (2013.01); *G01N 21/64* (2013.01); *G02B 21/0076* (2013.01);
(Continued)

(58) Field of Classification Search
CPC .............. G01N 21/64; G01N 21/6458; G02B 21/0004; G02B 21/006; G02B 21/008;
(Continued)

(56) References Cited

U.S. PATENT DOCUMENTS 10,725,278 B2 7/2020 Sase et al.
2008/0182336 A1 7/2008 Zhuang et al.
(Continued)

FOREIGN PATENT DOCUMENTS

EP 2660639 A1 11/2013
JP 2005-165212 A 6/2005
(Continued)

OTHER PUBLICATIONS

Mar. 1, 2016 International Search Report issued in International Patent Application No. PCT/JP2015/083511.
(Continued)

*Primary Examiner* — Derek S. Chapel
(74) *Attorney, Agent, or Firm* — Oliff PLC

(57) ABSTRACT

A microscope apparatus including: an illumination optical system that radiates activation light to activate some of fluorescent materials included in a sample and excitation light to excite at least some of the activated fluorescent materials; an image forming optical system that: has an objective lens and an astigmatic optical system that generates astigmatism to at least part of fluorescence from the fluorescent materials; and forms an image of the fluorescence; an image-capturing unit that captures an image formed by the image forming optical system; a drive unit that moves an image-capturing position in the sample along an optical axis-direction of the objective lens; and a control unit, wherein the control unit causes the image-capturing unit to capture images in a plurality of numbers of frames respectively at a first image-capturing position and at a second image-capturing position different from the first image-capturing position.

14 Claims, 19 Drawing Sheets

Related U.S. Application Data application No. PCT/JP2015/083511, filed on Nov. 27, 2015.

(51) Int. Cl.
  *G01N 21/64* (2006.01)
  *H04N 23/00* (2023.01)
  *G02B 21/00* (2006.01)

(52) U.S. Cl.
  CPC ........... *G02B 21/16* (2013.01); *G02B 21/365* (2013.01); *G02B 21/367* (2013.01); *H04N 23/00* (2023.01); *G01N 2201/06113* (2013.01)

(58) Field of Classification Search
  CPC ........... G02B 21/0084; G02B 21/0052; G02B 21/0064; G02B 21/0076; G02B 21/16; G02B 21/244; G02B 21/245; G02B 21/247; G02B 21/361; G02B 21/365; G02B 21/367; H04N 5/225; G01B 2201/06113
  See application file for complete search history.

(56) References Cited

U.S. PATENT DOCUMENTS

| | | | |
|---|---|---|---|
| 2010/0020392 A1 | 1/2010 | Okugawa | |
| 2012/0062722 A1* | 3/2012 | Sase | G02B 21/367 348/79 |
| 2018/0149855 A1* | 5/2018 | Chou | G02B 21/367 |
| 2018/0329225 A1* | 11/2018 | Kleckner | G06F 18/2415 |

FOREIGN PATENT DOCUMENTS

| | | |
|---|---|---|
| JP | 2008-275762 A | 11/2008 |
| JP | 2013-015665 A | 1/2013 |
| JP | 2014-29528 A | 2/2014 |
| JP | 2014-89311 A | 5/2014 |

OTHER PUBLICATIONS

Mar. 1, 2016 Written Opinion of the International Searching Authority issued in International Patent Application No. PCT/JP2015/083511.

May 21, 2019 Office Action issued in Japanese Patent Application No. 2017-552258.

Jun. 12, 2019 Search Report issued in European Patent Application No. 15909328.5.

Graham T. Dempsey. "A User's Guide To Localization-Based Super-Resolution Fluorescence Imaging". Methods in Cell Biology, Jan. 1, 2013, Academic Press, US, vol. 114, pp. 561-592.

Daniel J. Metcalf et al. "Test Samples for Optimizing Storm Super-Resolution Microscopy". Journal of Visualized Experiments, No. 79, Sep. 6, 2013, pp. 1-17.

Sep. 30, 2019 Search Report issued in European Patent Application No. 15909328.5.

Mark Bates et al. "Stochastic Optical Reconstruction Microscopy (STORM): A Method for Superresolution Fluorescence Imaging". Cold Spring Harbor Protocol, vol. 2013, No. 6, Jun. 1, 2013, pp. 498-520.

Anonymous. "Inverted Research Microscope Inverted Research Microscope Eclipse Ti—Live-Cell Imaging System". Mar. 15, 2013, URL: <https://www.nikon.com/products/microscope-solutions/support/download/brochures/pdf/2ce-mqjh-3.pdf> [retrieved on Sep. 17, 2019].

Jul. 14, 2020 Restriction Election Action issued in U.S. Appl. No. 15/991,426.

Aug. 20, 2020 Office Action issued in European Patent Application No. 15909328.5.

Jozsef Sinko et al. "TestSTORM: Simulator for optimizing sample labeling and image acquisition in localization based super-resolution microscopy." Biomedical Optics Express, vol. 5, No. 3, Feb. 18, 2014, pp. 778-787.

Melike Lakadamyali, et al. "3D Multicolor Super-Resolution Imaging Offers Improved Accuracy in Neuron Tracing". PLos One, vol. 7, issue 1, Jan. 24, 2012, pp. 1-10.

Dec. 2, 2020 Office Action issued in U.S. Appl. No. 15/991,426.

Sep. 29, 2020 Office Action issued in Japanese Patent Application No. 2019-205965.

* cited by examiner

| NO. | X | Y | Z | B | Wx | Wy |
|---|---|---|---|---|---|---|
| 1 | $x_1$ | $y_1$ | $z_1$ | $B_1$ | $Wx_1$ | $Wy_1$ |
| 2 | $x_2$ | $y_2$ | $z_2$ | $B_2$ | $Wx_2$ | $Wy_2$ |
| ⋮ | | | | | | |

SETTING OF IMAGE-CAPT. CONDITIONS

IMAGE-CAPT. POSITION

UPPER END: 1050 nm [Set]

LOWER END: 0 nm [Set]

Z STEP SIZE: 150 nm

| IMAGE-CAPT. POSITION | NO. OF FRAMES |
|---|---|
| 1~3 | 3000 |
| 4~5 | 4000 |
| 6~7 | 5000 |
| 8 | 6000 |

IMAGE-CAPT. SEQUENCE: BOTTOM TO TOP

FILE NAME: C001

[EXECUTE]

*FIG. 10*

SETTING OF IMAGE-CAPT. CONDITIONS

IMAGE-CAPT. POSITION

| | | | |
|---|---|---|---|
| UPPER END | 1050 | nm | Set |
| LOWER END | 0 | nm | Set |

| | | |
|---|---|---|
| Z STEP SIZE | 150 | nm |
| NO. OF PASSES | 10 | |
| ENTIRE NO. OF FRAMES | 10000 | |
| IMAGE-CAPT. SEQUENCE | BOTTOM TO TOP | |
| FILE NAME | C001 | |

EXECUTE

MICROSCOPE APPARATUS

This is a divisional of U.S. patent application Ser. No. 15/991,426 filed May 29, 2018, which in turn is a continuation of International Application No. PCT/JP2015/083511 filed Nov. 27, 2015. The contents of each of the above-identified prior applications is incorporated by reference herein in its entirety.

BACKGROUND

1. Technical Field

The present invention relates to a microscope apparatus, an image-capturing method and a program.

2. Related Art

There are microscope apparatuses that utilize single-molecule localization microscopy such as stochastic optical reconstruction microscopy (STORM) or photo-activated localization microscopy (PALM) (please see Patent Document 1, for example). Patent Document 1: United States Patent Application Publication No. 2008/0182336

In order to reconstruct the structure of a sample over a wide range in the thickness direction of the sample in such microscope apparatuses, it is necessary to relatively move the sample and an optical system in the optical axis-direction and capture images of fluorescence at a plurality of image-capturing positions. In view of this, improvement in the quality of an image reconstructed using an image-capturing result obtained through image-capturing performed at the plurality of image-capturing positions has been asked for.

SUMMARY

A first aspect of the present invention provides a microscope apparatus including: an illumination optical system that radiates activation light to activate some of fluorescent materials included in a sample and excitation light to excite at least some of the activated fluorescent materials; an image forming optical system that: has an objective lens and an astigmatic optical system that generates astigmatism to at least part of fluorescence from the fluorescent materials; and forms an image of the fluorescence; an image-capturing unit that captures an image formed by the image forming optical system; a drive unit that moves an image-capturing position in the sample along an optical axis-direction of the objective lens; and a control unit, wherein the control unit causes the image-capturing unit to capture images in a plurality of numbers of frames respectively at a first image-capturing position and at a second image-capturing position different from the first image-capturing position.

A second aspect of the present invention provides an image-capturing method performed at a microscope apparatus having: an illumination optical system that radiates activation light to activate some of fluorescent materials included in a sample and excitation light to excite at least some of the activated fluorescent materials; an image forming optical system that: has an objective lens and an astigmatic optical system that generates astigmatism to at least part of fluorescence from the fluorescent materials; and forms an image of the fluorescence; an image-capturing unit that captures an image formed by the image forming optical system; and a drive unit that moves an image-capturing position in the sample along an optical axis-direction of the objective lens, the image-capturing method including: causing the image-capturing unit to capture images in a plurality of numbers of frames respectively at a first image-capturing position and at a second image-capturing position different from the first image-capturing position.

A third aspect of the present invention provides a computer program product having computer instructions that: are recorded on a computer readable medium; and are executed by a computer that controls a microscope apparatus having:
an illumination optical system that radiates activation light to activate some of fluorescent materials included in a sample and excitation light to excite at least some of the activated fluorescent materials;
an image forming optical system that: has an objective lens and an astigmatic optical system that generates astigmatism to at least part of fluorescence from the fluorescent materials; and forms an image of the fluorescence;
an image-capturing unit that captures an image formed by the image forming optical system; and
a drive unit that moves an image-capturing position in the sample along an optical axis-direction of the objective lens,
the computer instructions, upon being executed by the computer, enabling the computer to perform operations including:
executing a procedure of causing the image-capturing unit to capture images in a plurality of numbers of frames respectively at a first image-capturing position and at a second image-capturing position different from the first image-capturing position.

The summary clause does not necessarily describe all necessary features of the embodiments of the present invention. The present invention may also be a sub-combination of the features described above.

BRIEF DESCRIPTION OF THE DRAWINGS

FIG. 7 shows one example of a data configuration 45 of three-dimensional distribution information about a centroid Q.

FIG. 10 shows one example of a screen on which image-capturing conditions in an image-capturing process are input.

FIG. 17 shows another example of a screen on which image-capturing conditions in an image-capturing process are input.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

A microscope apparatus according to an embodiment is, for example, a microscope apparatus utilizing single-molecule localization microscopy such as STORM or PALM. The microscope apparatus according to the present embodiment can generate a three-dimensional super-resolution image. The microscope apparatus according to an embodiment can be utilized for both: fluorescence observation of a sample labeled with one type of fluorescent material; and fluorescence observation of a sample labeled with two or more types of fluorescent material.

The sample may be one including live cells, may be one including cells fixed by using a tissue fixing solution such as a formaldehyde solution or may be tissues or the like. The fluorescent material may be a fluorescent pigment such as a cyanine dye or may be a fluorescent protein. The fluorescent pigment includes a reporter pigment that emits fluorescence upon reception of excitation light in its activated state where it is activated. In addition, the fluorescent pigment may in some cases include an activator pigment that bring the reporter pigment into an activated state upon reception of activation light. If the fluorescent pigment does not include an activator pigment, the reporter pigment enters an activated state upon reception of activation light. The fluorescent pigment is, for example: a dye pair obtained through bonding between two types of cyanine dye (examples: a Cy3-Cy5 dye pair (Cy3 and Cy5 are registered trademarks), a Cy2-Cy5 dye pair (Cy2 and Cy5 are registered trademarks), a Cy3-Alexa Fluor647 dye pair (Cy3 and Alexa Fluor are registered trademarks)); or one type of dye (example: Alexa Fluor647 (Alexa Fluor is a registered trademark)). The fluorescent protein may be, for example, PA-GFP, Dronpa or the like.

Figure 1:
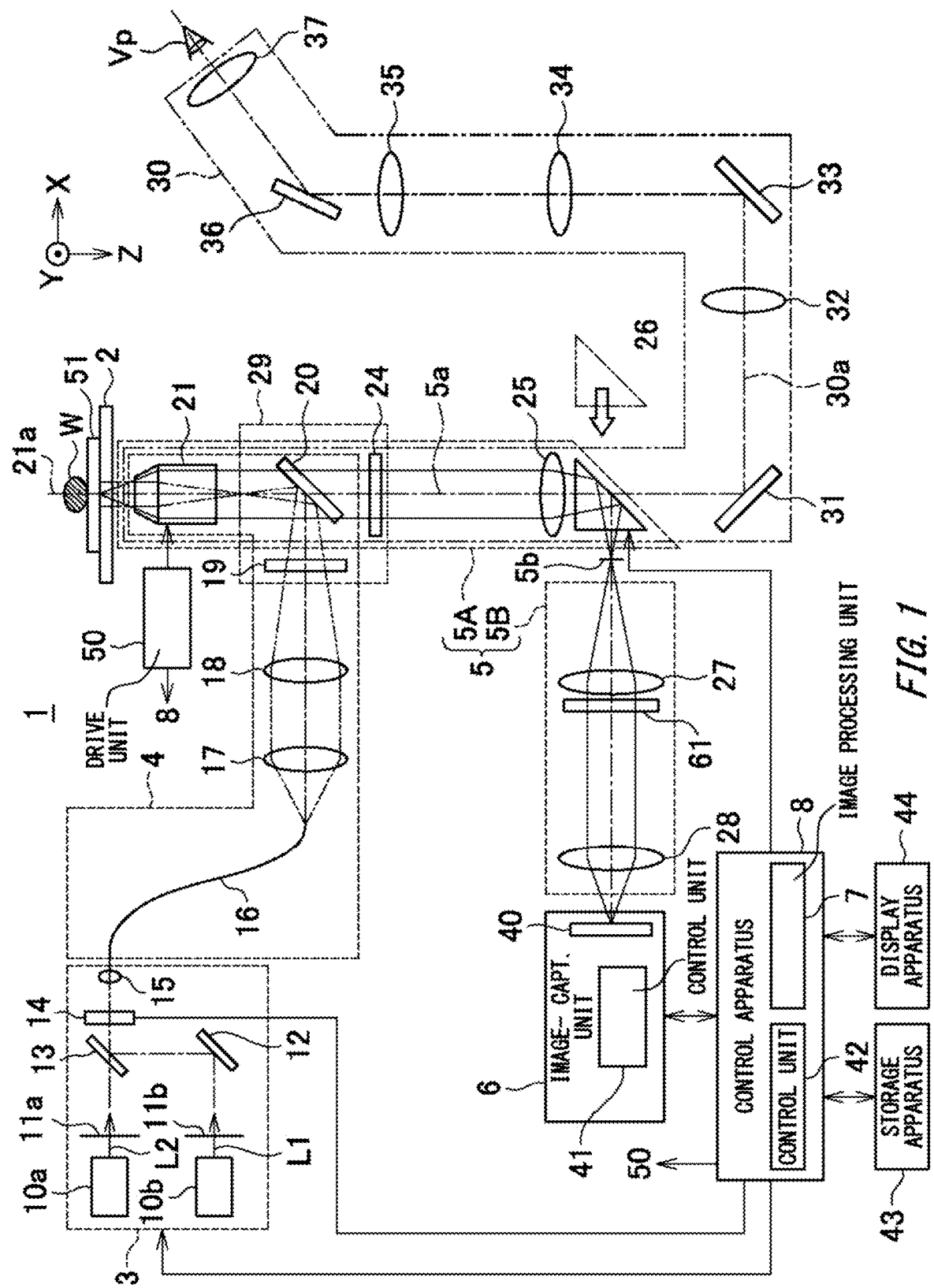
FIG. 1 is a figure showing a microscope apparatus 1 according to the present embodiment.

FIG. 1 is a figure showing a microscope apparatus 1 according to the present embodiment. The microscope apparatus 1 includes a stage 2, a light source apparatus 3, an illumination optical system 4, an image forming optical system 5, an image-capturing unit 6, an image processing unit 7 and a control apparatus 8. The control apparatus 8 includes a control unit 42 that performs overall control of each unit of the microscope apparatus 1. The control apparatus 8 may be a computer that executes procedures mentioned below by reading in a software program.

The stage 2 holds a cover glass 51. The cover glass 51 holds a sample W which is an observation target. More specifically, as shown in FIG. 1, the cover glass 51 is placed on the stage 2, and the sample W is placed on the cover glass 51. The stage 2 may move or may not move in the XY plane.

The light source apparatus 3 includes an activation light source 10a, an excitation light source 10b, a shutter 11a and a shutter 11b. The activation light source 10a emits activation light L2 that activates some of fluorescent materials included in the sample W. It is assumed here that the fluorescent materials include a reporter pigment, but does not include an activator pigment. The reporter pigment of the fluorescent materials is irradiated with the activation light L2 to enter the activated state where it can emit fluorescence. The fluorescent materials may include a reporter pigment and an activator pigment, and in this case, the activator pigment brings the reporter pigment into the activated state upon reception of the activation light L2. The fluorescent materials may be a fluorescent protein such as PA-GFP or Dronpa, for example.

The excitation light source 10b emits excitation light L1 that excites at least some of the fluorescent materials activated in the sample W. The fluorescent materials emit fluorescence or become deactivated upon being irradiated with the excitation light L1 in its activated state. The fluorescent materials enter the activated state again upon being irradiated with the activation light L2 when they are in a state where they are deactivated (hereinafter, referred to as the deactivated state).

The activation light source 10a and excitation light source 10b for example include solid-state light sources such as laser light sources, and respectively emit laser light at wavelengths corresponding to the types of fluorescent material. The emission wavelength of the activation light source 10a and the emission wavelength of the excitation light source 10b are for example selected from among approximately 405 nm, approximately 457 nm, approximately 488 nm, approximately 532 nm, approximately 561 nm, approximately 640 nm, approximately 647 nm and the like. Here, it is assumed that the emission wavelength of the activation light source 10a is approximately 405 nm, and the emission wavelength of the excitation light source 10b is a wavelength selected from among approximately 488 nm, approximately 561 nm and approximately 647 nm.

The shutter 11a is controlled by the control unit 42 and can switch between the state where the activation light L2 from the activation light source 10a is allowed to pass and the state where the activation light L2 is blocked. The shutter 11b is controlled by the control unit 42 and can switch between the state where the excitation light L1 from the excitation light source 10b is allowed to pass and the state where the excitation light L1 is blocked.

In addition, the light source apparatus 3 includes a mirror 12, a dichroic mirror 13, an acousto-optic element 14 and a lens 15. The mirror 12 is provided for example on the exit side of the excitation light source 10b. The excitation light L1 from the excitation light source 10b is reflected on the mirror 12 to enter the dichroic mirror 13.

The dichroic mirror 13 is provided for example on the exit side of the activation light source 10a. The dichroic mirror 13 has characteristics of transmitting the activation light L2 and of reflecting the excitation light L1. The activation light L2 transmitted through the dichroic mirror 13 and the excitation light L1 reflected on the dichroic mirror 13 pass through the same optical path to enter the acousto-optic element 14.

The acousto-optic element 14 is, for example, an acousto-optic filter or the like. The acousto-optic element 14 is controlled by the control unit 42 and can adjust the optical intensity of the activation light L2 and the optical intensity of the excitation light L1, respectively. In addition, the acousto-optic element 14 is controlled by the control unit 42 and, for each of the activation light L2 and the excitation light L1, can switch between the light-transmitting state where the activation light L2 or excitation light L1 is allowed to pass and the light-blocking state where the activation light L2 or excitation light L1 is blocked by the acousto-optic element 14 or where the intensity of the activation light L2 or excitation light L1 is lowered by the acousto-optic element 14. For example, if the fluorescent materials include a reporter pigment, but do not include an activator pigment, the control unit 42 controls the acousto-optic element 14 such that the activation light L2 and the excitation light L1 are simultaneously radiated onto the sample W. In addition, if the fluorescent materials include a reporter pigment and an activator pigment, the control unit 42 for example controls the acousto-optic element 14 such that the excitation light L1 is radiated onto the sample W after being irradiated with the activation light L2.

The lens 15 is, for example, a coupler, and concentrates the activation light L2 and the excitation light L1 from the acousto-optic element 14 onto a light-guiding member 16. The microscope apparatus 1 may not include at least part of the light source apparatus 3. For example, the light source apparatus 3 is formed into a unit, and may be provided replaceably to (attachably to and detachably from) the microscope apparatus 1. For example, the light source apparatus 3 may be attached to the microscope apparatus 1 at the time of observation with the microscope apparatus 1 or the like.

The illumination optical system 4 radiates the activation light L2 to activate some of fluorescent materials included in the sample W, and the excitation light L1 to excite at least some of the activated fluorescent materials. The illumination optical system 4 radiates the activation light L2 and excitation light L1 from the light source apparatus 3 onto the sample W. The illumination optical system 4 includes the light-guiding member 16, a lens 17, a lens 18, a filter 19, a dichroic mirror 20 and an objective lens 21.

The light-guiding member 16 is, for example, an optical fiber, and guides the activation light L2 and excitation light L1 to the lens 17. In FIG. 1 and other figures, optical paths from the exit end of the light-guiding member 16 to the sample W are indicated with dotted lines. The lens 17 is, for example, a collimator, and converts the activation light L2 and excitation light L1 into collimated light. The lens 18, for example, concentrates the activation light L2 and excitation light L1 onto a position on the pupil surface of the objective lens 21. The filter 19, for example, has characteristics of transmitting the activation light L2 and excitation light L1 and of blocking at least part of light at other wavelengths. The dichroic mirror 20 has characteristics of reflecting the activation light L2 and excitation light L1 and of transmitting light at wavelengths in the wavelength band of fluorescence emitted by fluorescent materials of the sample W. Light from the filter 19 is reflected on the dichroic mirror 20 to enter the objective lens 21. The sample W is arranged on the front-side focus surface of the objective lens 21 at the time of observation.

The activation light L2 and excitation light L1 are radiated onto the sample W by the illumination optical system 4 as mentioned above. The above-mentioned illumination optical system 4 is one example, and can be changed as appropriate. For example, part of the above-mentioned illumination optical system 4 may be omitted. In addition, the illumination optical system 4 may include at least part of the light source apparatus 3. In addition, the illumination optical system 4 may include an aperture stop, an irradiation field stop or the like.

The image forming optical system 5 forms an image of fluorescence from fluorescent materials included in the sample W. The image forming optical system 5 includes: a first optical system 5A to form a primary image of fluorescence having exited from the sample W; and a second optical system 5B to form an image of fluorescence as a secondary image at the image-capturing unit 6, from the primary image generated at the first optical system 5A. The first optical system 5A includes the objective lens 21, the dichroic mirror 20, a filter 24, a lens 25 and an optical path switching member 26. The second optical system 5B includes a lens 27, a lens 28, and a cylindrical lens 61 as an astigmatic optical system.

The image forming optical system 5 shares the objective lens 21 and dichroic mirror 20 with the illumination optical system 4. In FIG. 1 and other figures, optical paths between the sample W and the image-capturing unit 6 are indicated with solid lines. In addition, a drive unit 50 moves the objective lens 21 in the optical axis-direction of the objective lens 21, that is, the Z direction in FIG. 1.

Fluorescence from the sample W passes through the objective lens 21 and dichroic mirror 20 to enter the filter 24. The filter 24 has characteristics of selectively transmitting light at wavelengths in a predetermined wavelength band in light from the sample W. The filter 24, for example, blocks illumination light, external light, stray light or the like reflected on the sample W. The filter 24 is, for example, formed into a unit together with the filter 19 and dichroic mirror 20, and this filter unit 29 is provided replaceably. The filter unit 29 may be replaced, for example, depending on the wavelength of light to exit from the light source apparatus 3 (examples: the wavelength of the activation light L2, the wavelength of the excitation light L1), the wavelength of fluorescence radiated from the sample W, or the like, or a single filter unit that can cope with a plurality of excitation and fluorescence wavelengths may be utilized therefor.

Light having passed through the filter 24 enters the optical path switching member 26 through the lens 25. Light having exited from the lens 25 passes through the optical path switching member 26, and thereafter forms a primary image on an intermediate image surface 5b. The optical path switching member 26 is, for example, a prism, and is provided to an optical path of the image forming optical system 5 insertably and removably. The optical path switching member 26 is, for example, inserted into and removed from the optical path of the image forming optical system 5 by a drive unit (not illustrated) controlled by the control unit 42. The optical path switching member 26, if inserted into the optical path of the image forming optical system 5, guides fluorescence from the sample W to an optical path toward the image-capturing unit 6 by internal reflection.

The image-capturing unit 6 captures an image formed by the image forming optical system 5 (first observation optical system 5). The image-capturing unit 6 includes an image sensor 40 and a control unit 41. The image sensor 40 is, for example, a CMOS image sensor, but may be a CCD image sensor or the like. The image sensor 40, for example, has a plurality of two-dimensionally arrayed pixels, and has a structure in which a photoelectric converting element such as a photodiode is arranged in each pixel. The image sensor 40, for example, reads out electrical charges accumulated in the photoelectric converting elements by a read-out circuit. The image sensor 40 converts the electrical charges read out into digital data, and outputs data in a digital format in which the positions of pixels and gradation values are associated with each other (example: data about an image). The control unit 41 operates the image sensor 40 based on a control signal input from the control unit 42 of the control apparatus 8, and outputs data about a captured image to the control apparatus 8. In addition, the control unit 41 outputs, to the control apparatus 8, an electrical charge accumulation period and an electrical charge read-out period.

The above-mentioned image forming optical system 5 is one example, and can be changed as appropriate. For example, part of the above-mentioned image forming optical system 5 may be omitted. In addition, the image forming optical system 5 may include an aperture stop, a field stop or the like.

The microscope apparatus 1 according to the present embodiment includes a second observation optical system 30 utilized for setting of an observation range or the like. The second observation optical system 30 includes the objective lens 21, the dichroic mirror 20, the filter 24, the lens 25, a mirror 31, a lens 32, a mirror 33, a lens 34, a lens 35, a mirror 36, and a lens 37 in this order from the sample W to a viewpoint Vp of the observer. The observation optical system 30 shares the configuration ranging from the objective lens 21 to the lens 25 with the image forming optical system 5.

Light from the sample W passes through the lens 25, and thereafter enters the mirror 31 in the state where the optical path switching member 26 is withdrawn from the optical path of the image forming optical system 5. Light reflected on the mirror 31 enters the mirror 33 through the lens 32, is reflected on the mirror 33, and thereafter enters the mirror 36 through the lens 34 and lens 35. Light reflected on the mirror 36 enters the viewpoint Vp through the lens 37. The second observation optical system 30, for example, forms an intermediate image of the sample W in an optical path between the lens 35 and the lens 37. The lens 37 is, for example, an eye-piece, and the observer can perform setting of an observation range or the like by observing the intermediate image.

The control apparatus 8 performs collective control of each unit of the microscope apparatus 1. The control apparatus 8 includes the control unit 42 and the image processing unit 7. Based on a signal supplied from the control unit 41 and indicating an electrical charge accumulation period and an electrical charge read-out period, the control unit 42 supplies the acousto-optic element 14 with a control signal to switch between the light-transmitting state where light from the light source apparatus 3 is allowed to pass and the light-blocking state where light from the light source apparatus 3 is blocked. Based on this control signal, the acousto-optic element 14 switches between the light-transmitting state and the light-blocking state. The control unit 42 controls the acousto-optic element 14 to control the period during which the sample W is irradiated with the activation light L2 and the period during which the sample W is not irradiated with the activation light L2. In addition, the control unit 42 controls the acousto-optic element 14 to control the period during which the sample W is irradiated with the excitation light L1 and the period during which the sample W is not irradiated with the excitation light L1. The control unit 42 controls the acousto-optic element 14 to control the optical intensity of the activation light L2 radiated onto the sample W and the optical intensity of the excitation light L1 radiated onto the sample W. The control unit 42 controls the image-capturing unit 6 to cause the image sensor 40 to execute image-capturing.

In place of the control unit 42, the control unit 41 may supply the acousto-optic element 14 with a control signal to switch between the light-blocking state and the light-transmitting state and control the acousto-optic element 14 based on a signal indicating an electrical charge accumulation period and an electrical charge read-out period (information about image-capturing timing). The control unit 42 acquires data as an image-capturing result from the image-capturing unit 6. The image processing unit 7 uses the image-capturing result of the image-capturing unit 6 to perform image processing such as obtaining the centroids of individual images. The control unit 42 causes the image-capturing unit 6 to capture images in a plurality of frame periods, and the image processing unit 7 generates a single image using at least some of image-capturing results obtained in the plurality of frame periods.

The control apparatus 8 is, for example, connected to a storage apparatus 43 and a display apparatus 44 respectively communicatably. The display apparatus 44 is, for example, a liquid crystal display or the like. The display apparatus 44, for example, displays various types of images such as images indicating various types of setting of the microscope apparatus 1, images captured by the image-capturing unit 6 or images generated from captured images. The control unit 42 controls the display apparatus 44 to cause the display apparatus 44 to display various types of images. For example, the control unit 42 supplies the display apparatus 44 with data about super-resolution images such as a STORM image or a PALM image generated by the image processing unit 7, and causes the display apparatus 44 to display the image. For example, the microscope apparatus 1 can display, as a live video, super-resolution images of the sample W, which is an observation target, and so on. The storage apparatus 43 is, for example, a magnetic disk, an optical disk or the like, and stores various types of data such as data about various types of setting of the microscope apparatus 1, data about results of image-capturing by the image-capturing unit 6 or data about images generated by the image processing unit 7. The control unit 42, for example, can supply the display apparatus 44 with data about a super-resolution image stored in the storage apparatus 43 and cause the display apparatus 44 to display the super-resolution image. The control unit 42 controls the storage apparatus 43 to cause the storage apparatus 43 to store various types of data.

Figure 2:
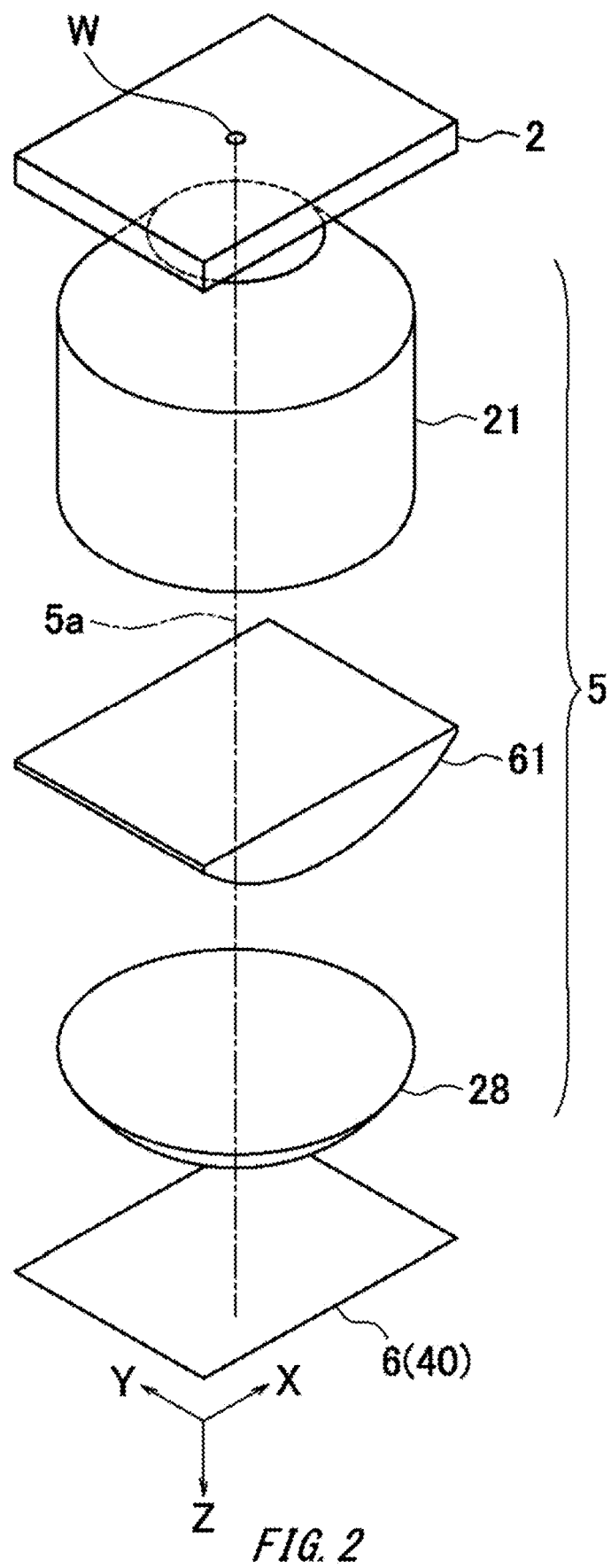
FIG. 2 is a figure showing an image forming optical system 5 and an image sensor 40.

FIG. 2 is a figure showing the image forming optical system 5 and the image sensor 40. Although in FIG. 1, the image forming optical system 5 is an optical system whose optical axis 5a makes a turn at the optical path switching member 26, in FIG. 2, the image forming optical system 5 is conceptually shown as a straight optical system. In addition, in FIG. 2, illustration of the configuration between the objective lens 21 and the cylindrical lens 61 is omitted. Here, the direction parallel with the optical axis 5a of the image forming optical system 5 is assumed to be the Z direction, and two directions that are vertical to the Z direction and are vertical to each other are assumed to be the X direction and Y direction. The X direction is, for example, the horizontal direction of the image sensor 40, and the Y direction is, for example, the vertical direction of the image sensor 40.

The cylindrical lens 61 is an optical member having power (refractive power) in only either one of the vertical direction and the horizontal direction. Here, in the following explanation, the cylindrical lens 61 has power in the XZ plane, but does not have power in the YZ plane. In place of the cylindrical lens 61, the astigmatic optical system may be one using a toroidal lens which has power in both the vertical direction and the horizontal direction which is different in these two directions.

Figure 3:
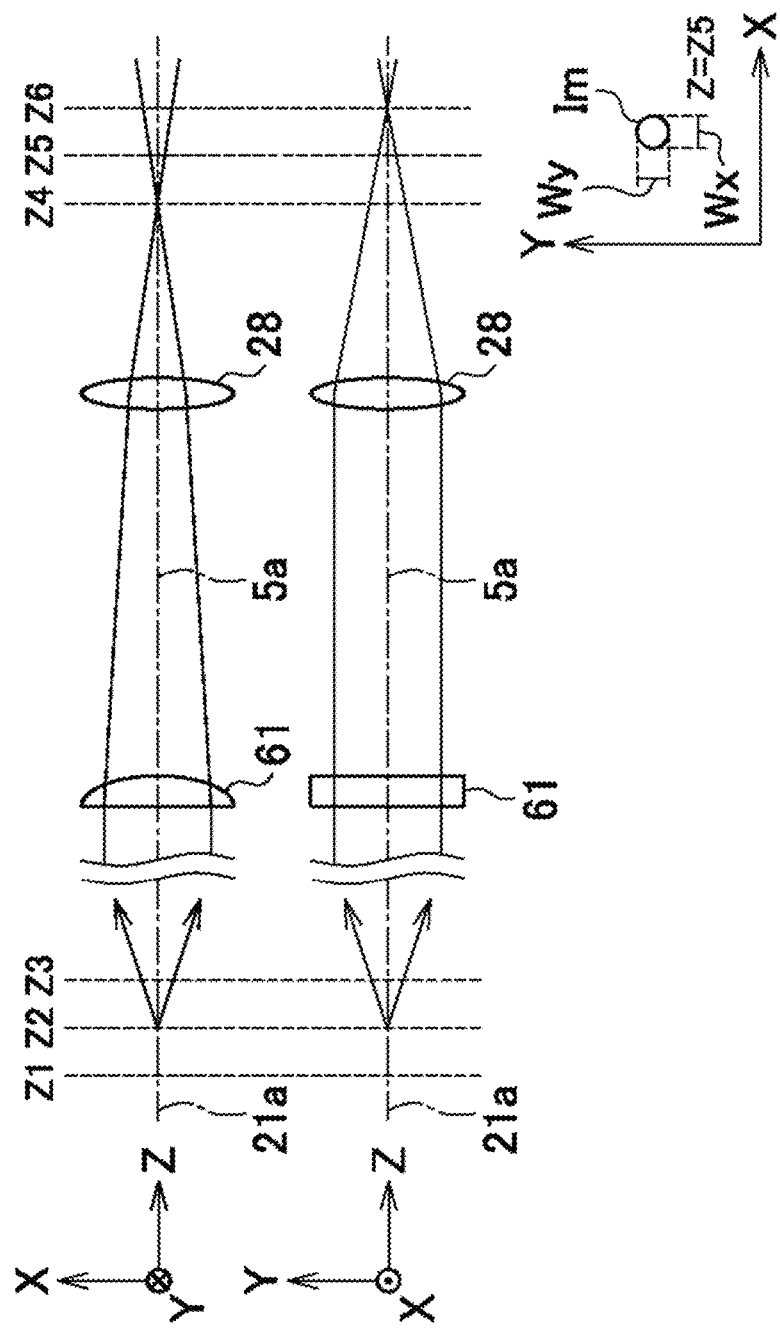
FIG. 3 is a figure showing an optical path of fluorescence from and an image of fluorescence from a position Z2 in a sample W.

FIG. 3 is a figure showing an optical path of fluorescence from and an image of fluorescence from a position Z2 in the sample W. First, the optical path in the XZ plane is explained. Fluorescence from a fluorescent material present at the position Z2 in the sample W enters the cylindrical lens 61 as collimated light. This fluorescence heads to the image sensor 40 while at the same time being concentrated by refraction at the cylindrical lens 61. The width Wx of an image of fluorescence in the X direction becomes the smallest at a position Z4 corresponding to the focus in the XZ plane. In addition, the width Wx increases as the distance from the position Z4 increases toward the side opposite to the sample W (+Z side).

Next, the optical path in the YZ plane is explained. Fluorescence from a fluorescent material present at the position Z2 in the sample W enters the cylindrical lens 61 as collimated light. This fluorescence enters the lens 28 almost without being refracted by the cylindrical lens 61. This fluorescence heads to the image sensor 40 while at the same time being concentrated by refraction at the lens 28. The width Wy of an image of fluorescence in the Y direction becomes the smallest at a position Z6 corresponding to the focus in the YZ plane. The width Wy increases as the distance from the position Z6 increases toward the side on which the sample W is located (−Z side).

At a position Z5 which is an intermediate position between the position Z4 and the position Z6, the width Wx of the image of fluorescence in the X direction and the width Wy of the image of fluorescence in the X direction become equal to each other, and the image of fluorescence becomes a perfect circle. Accordingly, if the image sensor 40 is arranged at the position Z5, a perfect circle image is acquired as an image of fluorescence from a fluorescent material present at the position Z2 in the sample W.

Figure 4:
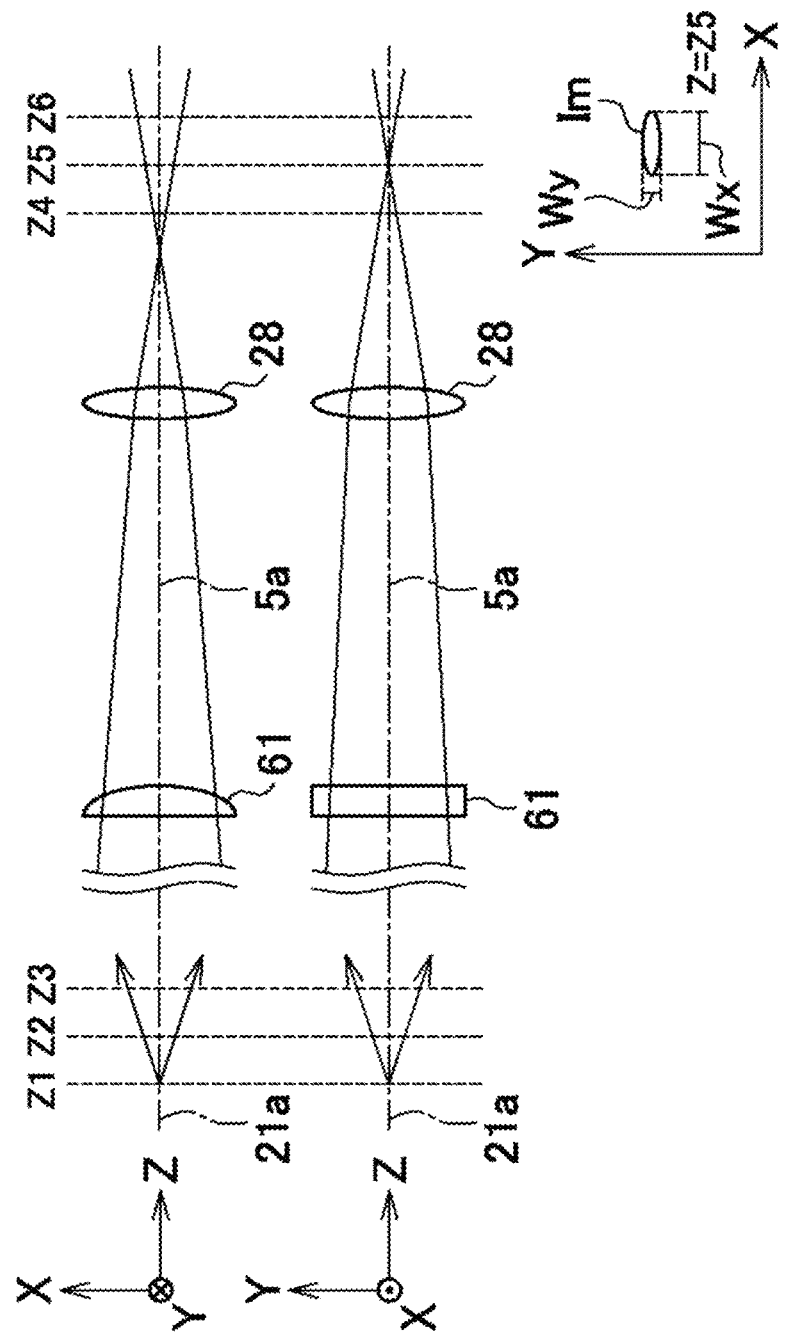
FIG. 4 is a figure showing an optical path of fluorescence from and an image of fluorescence from a fluorescent material present at a position Z1 in the sample W.

FIG. 4 is a figure showing an optical path of fluorescence from and an image of fluorescence from a fluorescent material present at a position Z1 in the sample W. The position Z1 is located on the side opposite to the image sensor 40 relative to the position Z2 (−Z side). In the XZ plane, the width Wx of an image of fluorescence in the X direction becomes the smallest at a position away from the position Z4 toward the sample W side (−Z side). On the other hand, in the YZ plane, the width Wy of an image of fluorescence in the Y direction becomes the smallest at the position Z5. Accordingly, if the image sensor 40 is arranged at the position Z5, an ellipse image with its major axis extending in the X direction is acquired as an image of fluorescence from a fluorescent material present at the position Z1 in the sample W.

Figure 5:
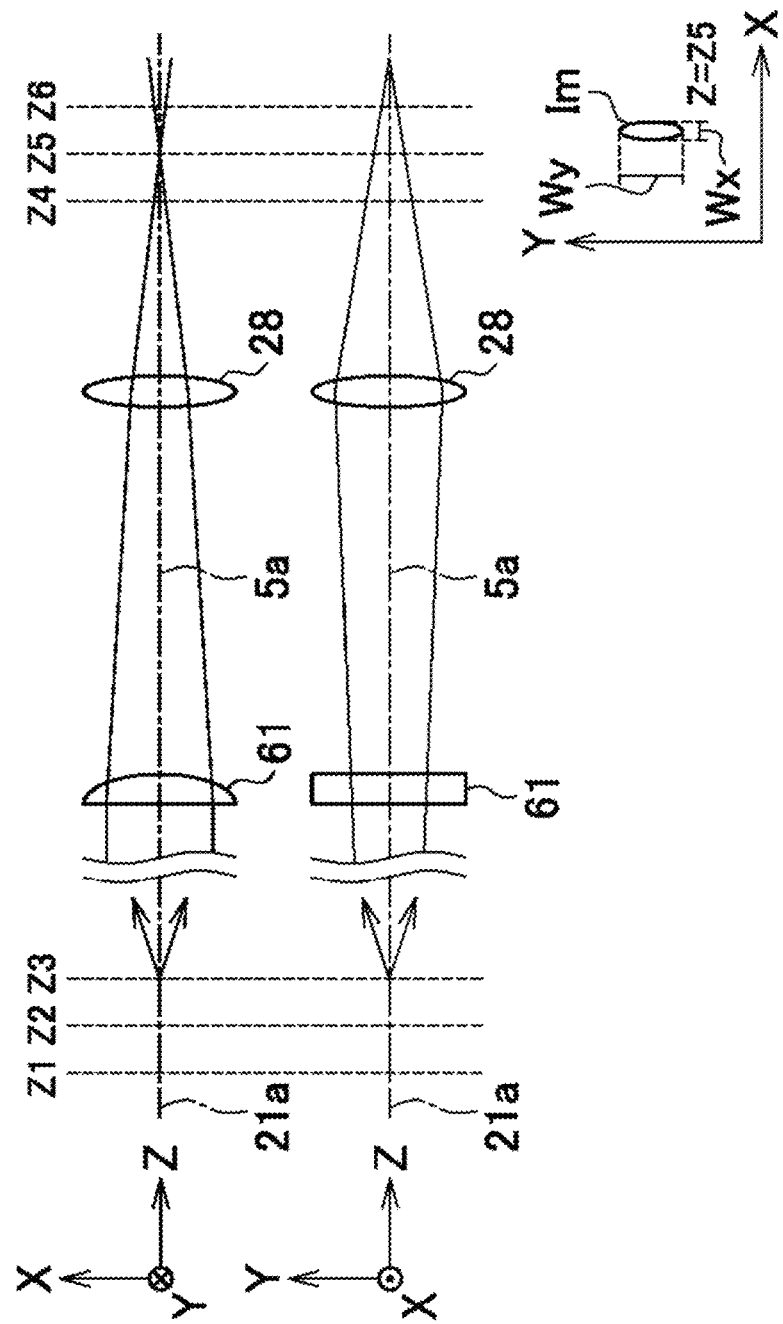
FIG. 5 is a figure showing an optical path of fluorescence from and an image of fluorescence from a fluorescent material present at a position Z3 in the sample W.

FIG. 5 is a figure showing an optical path of fluorescence from and an image of fluorescence from a fluorescent material present at a position Z3 in the sample W. The position Z3 is located on the side on which the image sensor 40 is located (+Z side) relative to the position Z2. In the XZ plane, the width Wx of an image of fluorescence in the X direction becomes the smallest at the position Z5. On the other hand, in the YZ plane, the width Wy of an image of fluorescence in the Y direction becomes the smallest at a position away from the position Z6 toward the side opposite to the sample W (+Z side). Accordingly, if the image sensor 40 is arranged at the position Z5, an ellipse image with its major axis extending in the Y direction is acquired as an image of fluorescence from a fluorescent material present at the position Z3 in the sample W.

In this manner, the relationship between the width Wx and width Wy of an image of fluorescence, for example the ratio, changes depending on positions in the sample W in the Z direction (the direction which is the same as an optical axis 21a of the objective lens 21). Therefore, the image processing unit 7, for example, performs elliptical Gaussian fitting to identify the width Wx and width Wy, in addition to the centroid of an image of fluorescence. Thereby, the image processing unit 7 can identify the position, in the XY plane, of a fluorescent material corresponding to an image of fluorescence based on the centroid, and additionally identify the Z direction position based on the relationship between the width Wx and the width Wy.

Figure 6:
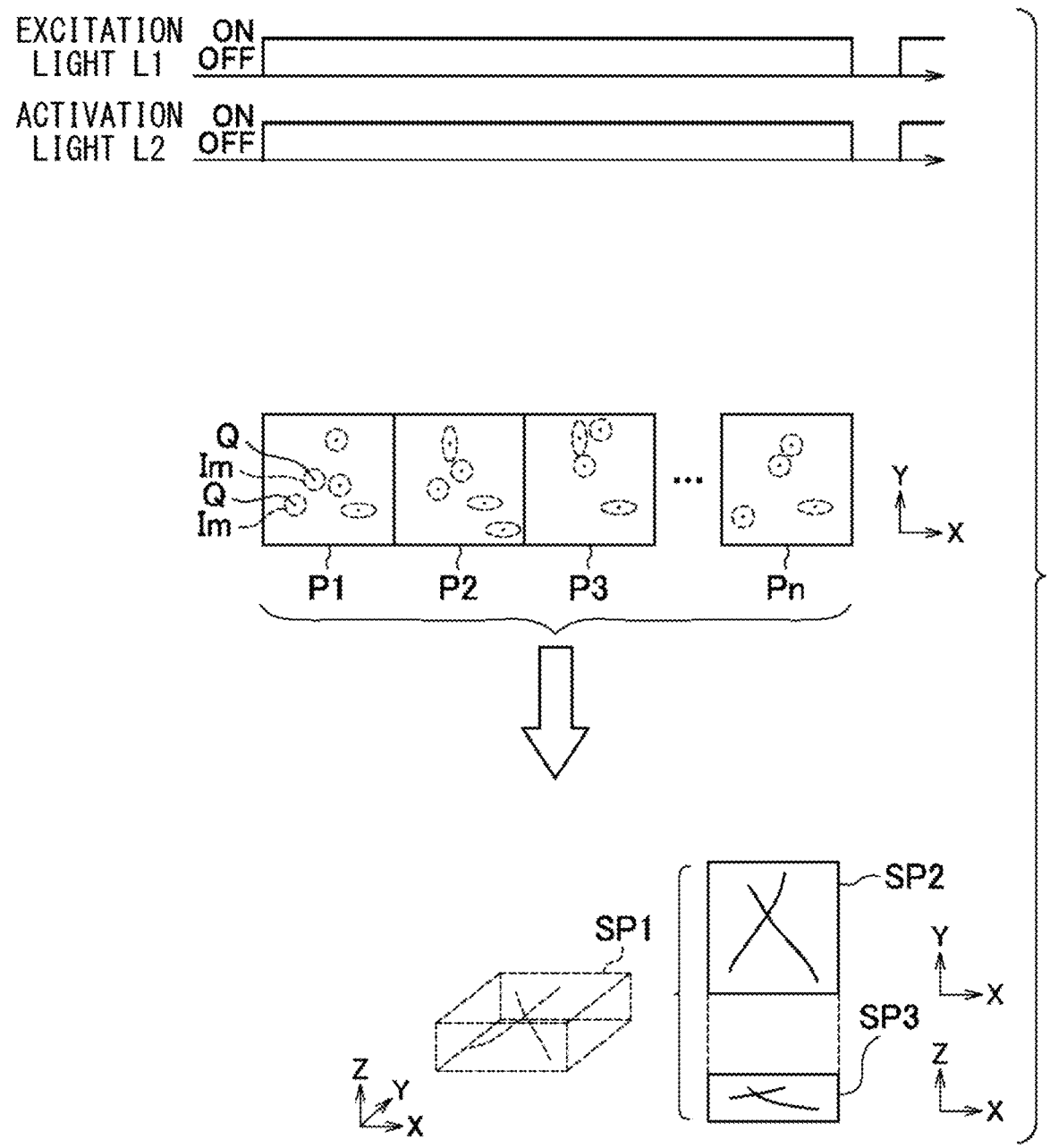
FIG. 6 is a figure showing one example of image processing performed by an image processing unit 7.

FIG. 6 is a figure showing one example of image processing performed by the image processing unit 7 at a predetermined image-capturing position. Here, the image-capturing position refers to the position of the front-side focus of the objective lens 21 in the sample W.

In FIG. 6, reference symbols P1 to Pn represent image-capturing results obtained in predetermined image-capturing frame periods. Because fluorescent materials activated at a probability corresponding to the intensity of the activation light L2 emit fluorescence upon being irradiated with the excitation light L1, the number of fluorescent materials corresponding to this probability emit fluorescence in one frame, and different fluorescent materials emit fluorescence in different frames.

The image processing unit 7 calculates, for each among the captured images P1 to Pn, the centroid and respective widths in the X and Y directions of an image of fluorescence included in each image. The image processing unit 7, for example, performs elliptical Gaussian fitting on the distribution of pixel values in this region to calculate the XY position of the centroid and the widths Wx, Wy. The image processing unit 7 also identifies the Z direction position of the centroid based on the relationship between the calculated widths Wx, Wy and by referring to a prestored table or the like. Thereby, the image processing unit 7, for example, uses at least some of a plurality of centroids Q corresponding to a plurality of images of fluorescence for which the centroids Q of images of fluorescence Im are calculated and that are included in a plurality of the captured images P1 to Pn to generate three-dimensional distribution information about the centroids Q. In addition, based on the three-dimensional distribution information, a three-dimensional super-resolution image SP1 is generated and displayed. The super-resolution image SP is one obtained through reconstruction of a three-dimensional structure of the sample W. The three-dimensional distribution information obtained at a predetermined image-capturing position is referred to as a layer.

In the example of FIG. 6, the three-dimensional super-resolution image SP1 is shown as a three-dimensional image that allows a user to specify the viewing direction. Instead of this or in addition to this, an image SP2 projected onto the XY plane and an image SP3 projected onto the XZ plane may be displayed.

FIG. 7 shows one example of a data configuration 45 of three-dimensional distribution information about centroids Q. In the example of FIG. 7, XYZ coordinates of centroids Q are associated with the numbers to identify these centroids Q. Furthermore, the brightness B and widths Wx, Wy may be associated.

Three-dimensional distribution information in this configuration is stored in the storage apparatus 43.

As explained with reference to FIG. 6, the microscope apparatus 1 allows reconstruction of a structure in the thickness direction of the sample W (that is, the optical axis-direction 21a of the objective lens) even if the objective lens 21 is fixed in the optical axis-direction. However, in the state where the objective lens 21 is fixed in the optical axis-direction 21a, the range in the thickness direction over which the structure can be reconstructed is inevitably restricted by factors such as the depth of field of the image forming optical system 5, fluorescence intensity, the S/N ratio of an image sensor or the focal distance of the cylindrical lens 61, with the center of the range being at the image-capturing position. If the sample W is observed, the range in the thickness direction over which a structure can be reconstructed is about 300 nm. In view of this, in the present embodiment, a structure of the sample W is reconstructed over a wide range in the thickness direction by capturing images of fluorescence by the image-capturing unit 6 while at the same time moving the objective lens 21 by the drive unit 50 in the optical axis-direction 21a of the objective lens 21.

Figure 8:
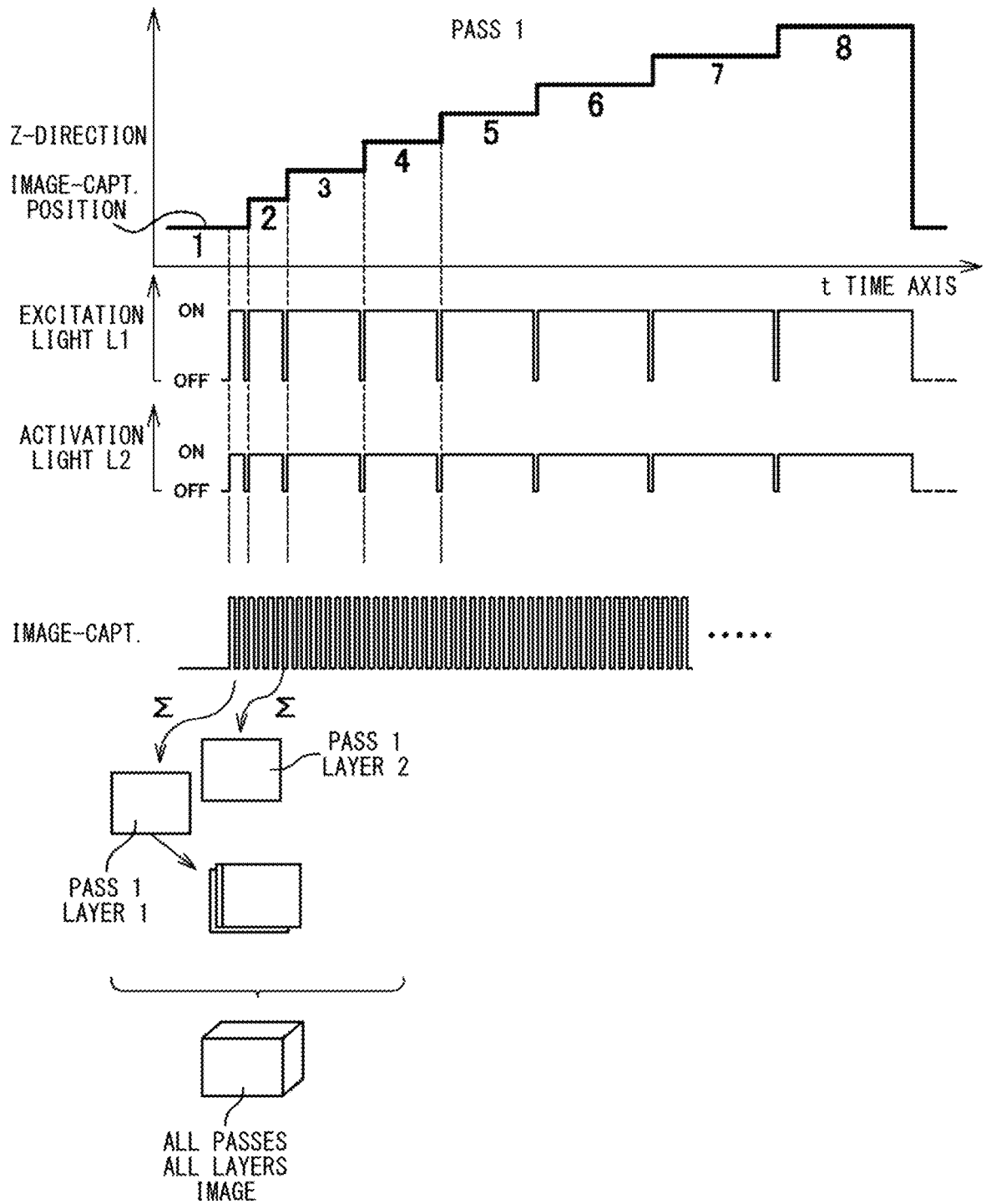
FIG. 8 is a schematic diagram of a sequence of actions performed by the microscope apparatus 1.
Figure 9:
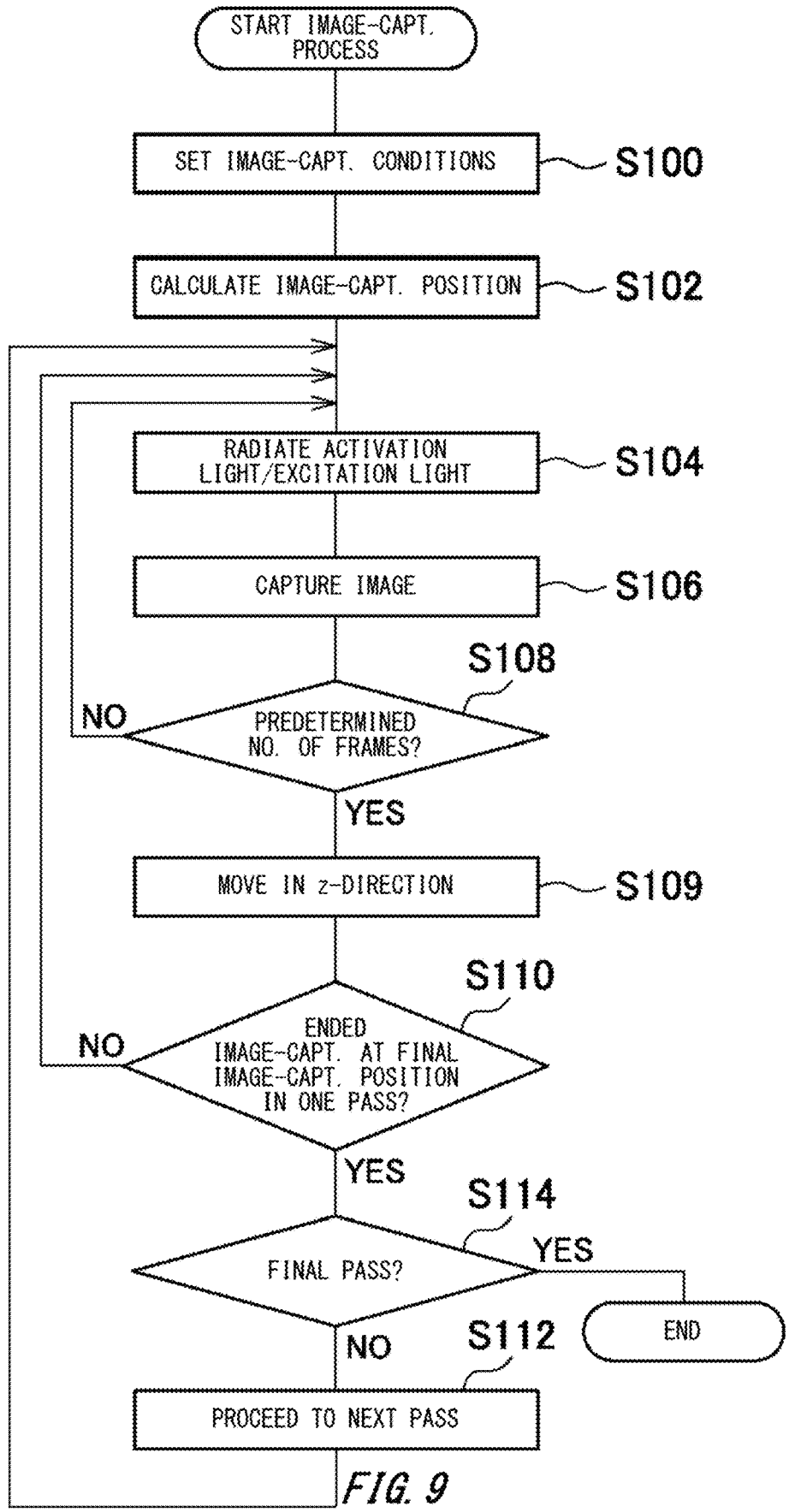
FIG. 9 is a flowchart showing an image-capturing process performed by the microscope apparatus 1.

FIG. 8 is a schematic diagram of a sequence of actions performed by the microscope apparatus 1. FIG. 9 is a flowchart showing an image-capturing process performed by the microscope apparatus 1. In addition, FIG. 10 shows one example of a screen on which image-capturing conditions in an image-capturing process are input.

Performing image-capturing multiple times at a predetermined image-capturing position by the image-capturing unit 6 is assumed to be one unitary image-capturing process. In addition, as shown in FIG. 7, a procedure of acquiring images at a plurality of predetermined image-capturing positions is referred to as a passing procedure. Therefore, the passing procedure means, for example, that the objective lens 21 moves from an image-capturing position 1 to an image-capturing position 8 in the direction of the optical axis 5a of the objective lens 21 to capture images. These terms are used for simplifying explanation, and are not used to limit the scope of rights.

As shown in the flowchart of FIG. 9, first, image-capturing conditions are set in an image-capturing process (S100). In this case, the microscope apparatus 1 displays a screen 100 as shown in FIG. 10 on the display apparatus 44. Through the screen 100 and as image-capturing conditions, the control apparatus 8 accepts inputs of the position of the lowermost plane for image-capturing, the position of the uppermost plane for image-capturing, the step size in the Z direction, the number of frames to be acquired at each image-capturing position and the name of a file for storing three-dimensional distribution information.

In the example of FIG. 10, a user manually inputs the numbers of image-capturing positions and the numbers of frames corresponding to them. Instead of this, the numbers of frames corresponding to image-capturing positions may be automatically calculated based on a predetermined rule. For example, if the density of dyed cellular tissues is high at lower layers of the cell and decreases at higher layers, it is preferable to increase the number of frames as the distance of the image-capturing position from the cover glass 51 increases.

Furthermore, an image-capturing sequence in each passing procedure may be specified. For example, in initial setting, a sequential movement from a lower image-capturing position to an upper image-capturing position as mentioned above is selected. Instead of this image-capturing sequence, image-capturing sequences such as from top to bottom, even-numbered image-capturing positions first and odd-numbered image-capturing positions next, or random may be allowed to be selected.

In addition, for example, if the image-capturing position moves to the positions Z1 to Z8 shown in FIG. 8, the image-capturing sequence may be specified as Z1, Z8, Z2, Z7, Z3, Z6 and Z5. With this image-capturing sequence, it becomes possible to obtain an image with a clear outline of the sample.

If the image-capturing conditions are input and an image-capturing start button is pressed, the control apparatus 8 calculates the image-capturing position, that is, the amount of driving by the drive unit 50 based on the image-capturing conditions (S102). In this case, it is preferable to set the image-capturing positions and/or other image-capturing conditions such that adjacent layers partially overlap in the thickness direction of the sample W. FIG. 8 shows an example of a sequence of actions in which the number of layers is eight and the number of times of passing procedures is one.

The illumination optical system 4 radiates the activation light L2 and excitation light L1 from the light source 3 onto the sample W1 (S104), and performs image-capturing by the image-capturing unit 6 (S106) in a predetermined number of frames corresponding to an image-capturing position (S108: No).

Upon completion of image-capturing in a predetermined number of frames (S108: Yes), the drive unit 50 moves the objective lens 21 to the next image-capturing position (S109). The above-mentioned Step S104 to S109 are repeated for calculated image-capturing positions (S110: No).

Upon completion of image-capturing at the final image-capturing position (S110: Yes), the control unit 8 judges whether or not the process has reached the final passing procedure (S111). If the process has not reached the final passing procedure (S111: No), the process proceeds to the next passing procedure and repeats Steps S104 to S110. If the process has reached the final passing procedure (S111: Yes), the image-capturing process ends.

In this manner, according to the present embodiment, if a structure of a sample is reconstructed by a method such as STORM, the structure of the sample can be reconstructed over a range wider than the range in the thickness direction restricted by the focal distance of a cylindrical lens or the like. In particular, because a structure of a sample is reconstructed on the basis of a result of image-capturing in the number of frames that is different for each image-capturing position, improvement in the image quality of a reconstructed image corresponding to the shape or properties of the sample can be expected.

During or after the above-mentioned image-capturing process, the image processing unit 7 identifies the centroids of fluorescence in each image-capturing frame, as explained with reference to FIG. 6. The image processing unit 7 further stores, in the storage apparatus 43 and as a file of a data configuration shown in FIG. 7, three-dimensional distribution information about the centroids identified in each image-capturing frame included in a unitary image-capturing process for each image-capturing position.

Figure 11:
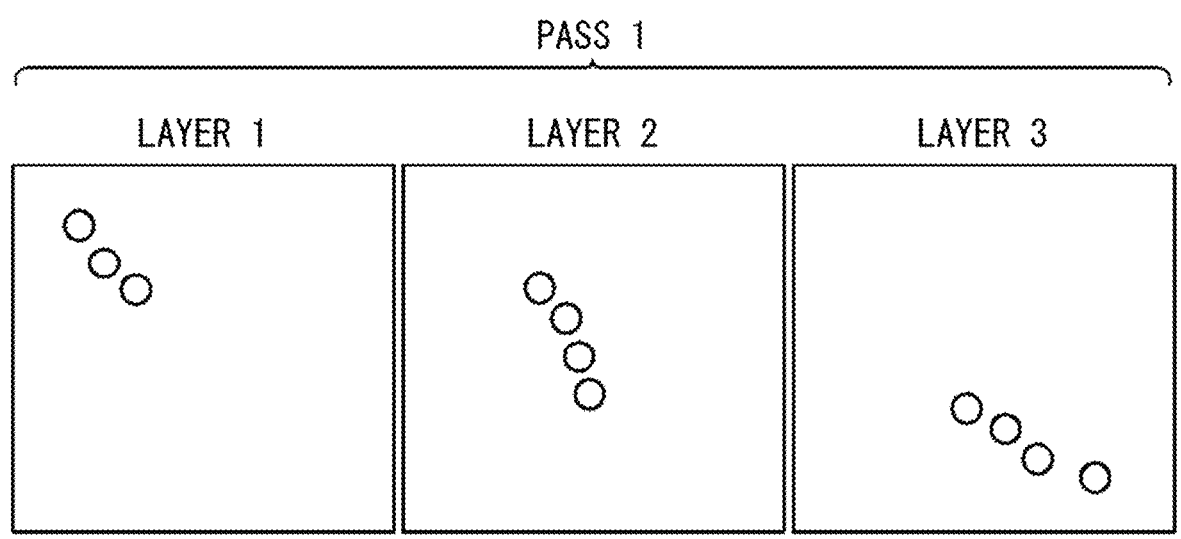
FIG. 11 is a schematic diagram showing three-dimensional distribution information about the centroid of fluorescence.

FIG. 11 is a schematic diagram showing a plurality of layers identified by image-capturing at a plurality of image-capturing positions. FIG. 11 shows the case where the number of layers is three and the number of times of passing procedures is one.

The image processing unit 7 stores, in the storage apparatus 43, the centroids of fluorescence identified passing procedure-by-passing procedure and layer-by-layer, that is, for each unitary image-capturing process, in association with information identifying passing procedures and layers. The Z position of the centroid of each fluorescent beam in the sample space is identified using the image-capturing position based on the amount of driving by the drive unit 50 and the Z position of the centroid of fluorescence in each layer (the Z position of the centroid calculated from a captured image of fluorescence). The image-capturing position is the position of the front-side focus of the objective lens 21 in the sample as mentioned above, but the position of the front-side focus may be a position relative to the cover glass 51.

Figure 12:
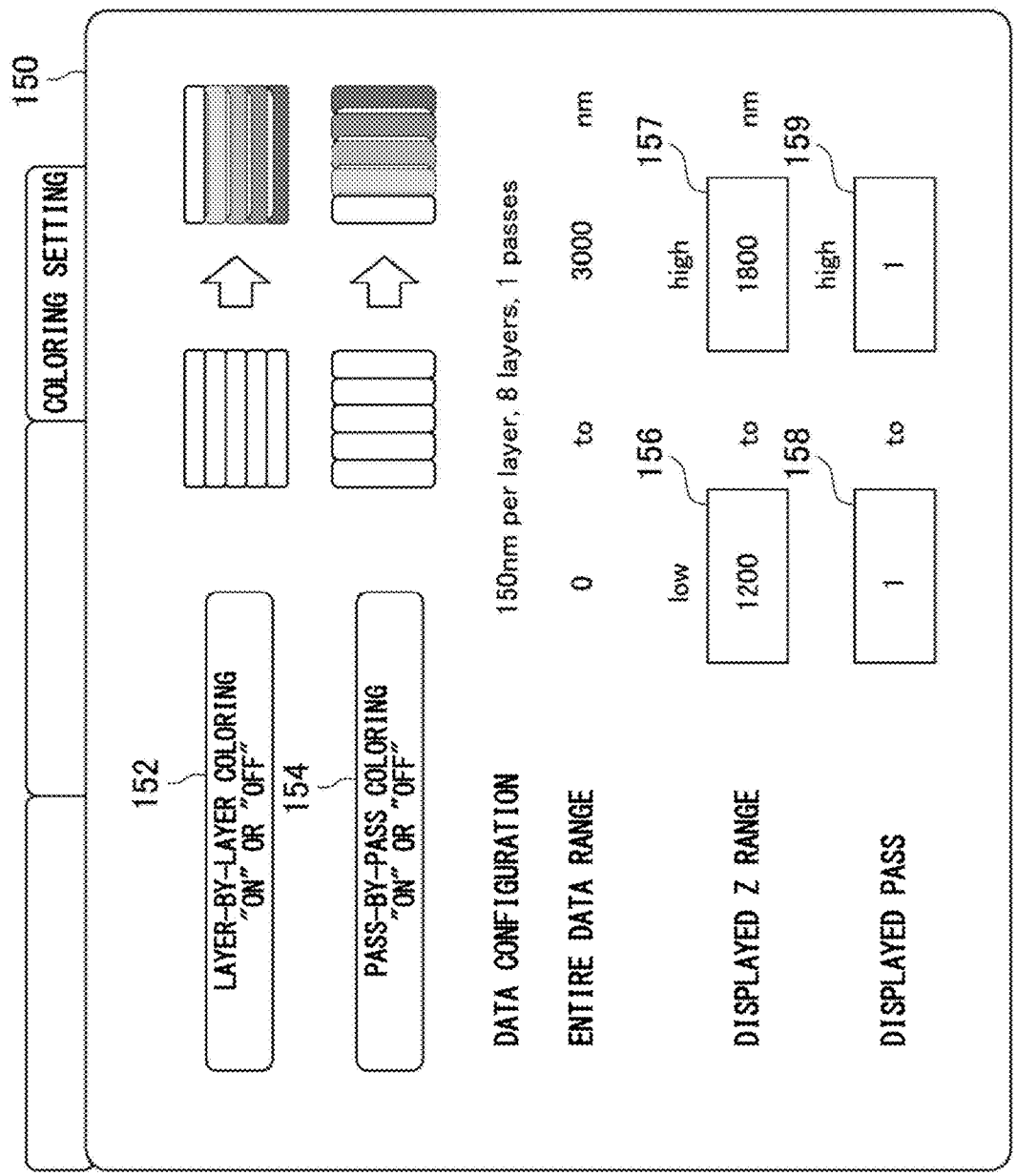
FIG. 12 shows one example of a screen 150 on which setting of a reconstructed display image of the sample W is performed.

FIG. 12 shows one example of a screen 150 on which setting of a reconstructed display image of the sample W is performed. The screen 150 is displayed on the display apparatus 44, and accepts setting about whether or not to display an image while visually distinguishing passing procedures, layers or both of them.

FIG. 12 shows an example in which display colors are used, as a method of visual distinguishing. In this case, different ones among three attributes of color may be used for passing procedures and layers; for example, passing procedures may be distinguished by hues, and layers may be distinguished by luminosity. Thereby, both passing procedure-by-passing procedure and layer-by-layer visual distinguishing becomes possible.

Instead of or in addition to display colors, visual distinguishing may be enabled using hatching or shapes, for example, using circles, triangles, x marks or the like.

A region 152 on the screen 150 is for selecting whether or not to perform coloring differently layer-by-layer, and a region 154 on the screen 150 is for selecting whether or not to perform coloring differently passing procedure-by-passing procedure. To the right of the region 152, respective outlined layers are schematically shown with the layers being arrayed from top to bottom, and to the further right of them, the state where coloring is performed differently layer-by-layer if it is selected to perform coloring differently layer-by-layer is schematically shown. To the right of the region 154, respective outlined passing procedures are schematically shown with the passing procedures being arrayed from left to right, and to the further right of them, the state where coloring is performed differently passing procedure-by-passing procedure if it is selected to perform coloring differently passing procedure-by-passing procedure is schematically shown. In addition, a box 156 is for inputting the lower limit of the range to be displayed in the Z direction, and a box 157 is for inputting the upper limit of the range to be displayed in the Z direction. Furthermore, a box 158 is for inputting the lower limit of passing procedures to be displayed, and a box 159 is for inputting the upper limit of passing procedures to be displayed.

Information about the configuration and range of data obtained through an image-capturing process is further displayed on the screen 150. As the data configuration, the thickness of a layer, number of layers and number of times of passing procedures are displayed.

Figure 13:
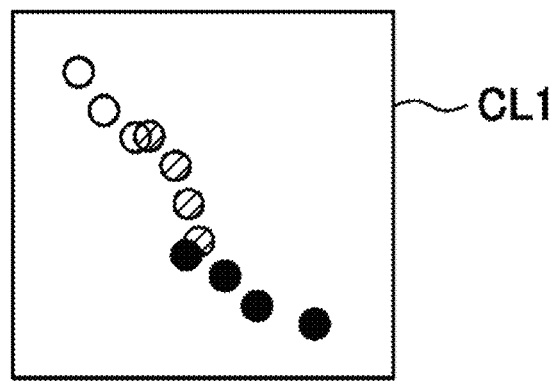
FIG. 13 shows a display image CL1 in which coloring is performed differently layer-by-layer.

FIG. 13 shows a display image CL1 in which coloring is performed differently layer-by-layer using the three-dimensional distribution information shown in FIG. 11 and according to the setting shown in FIG. 12. However, because colors cannot be used in the figures, white, hatching and black are used instead of colors.

The image processing unit 7 accesses the centroids of fluorescence stored in the storage apparatus 43, and allocates colors based on information identifying layers. The image processing unit 7 allocates white to the centroids of fluorescence in a layer 1, allocates hatching to the centroids of fluorescence in a layer 2, and allocates black to the centroids of fluorescence in a layer 3 to generate the display image CL1 and displays it on the display apparatus 44.

In this manner, because according to the present embodiment, the image processing unit 7 displays an image such that it is possible to visually distinguish which centroid belongs to which one among a plurality of layers, a user can easily recognize the degree of drifts of the objective lens 21 and stage 2 among layers (which appear for example as positional displacement).

Figure 14:
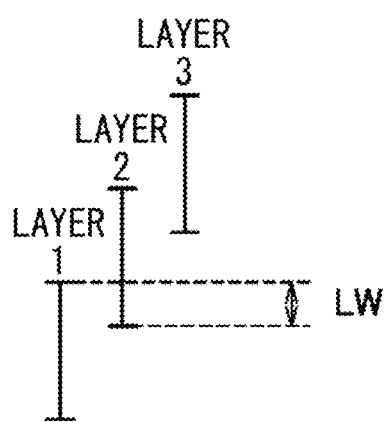
FIG. 14 is a schematic diagram showing laps among layers in the thickness direction of a sample.

FIG. 14 is a schematic diagram showing laps among layers in the thickness direction of a sample. As mentioned above, a plurality of image-capturing positions are preferably set such that parts of three-dimensional distribution information to be generated as a result overlap in the thickness direction of the sample. FIG. 14 indicates that there is a lap Lw between the layer 1 and the layer 2. In view of this, the setting screen 150 in FIG. 12 preferably allows setting such that the centroid included in the lap Lw is displayed, manually or automatically.

Figure 15:
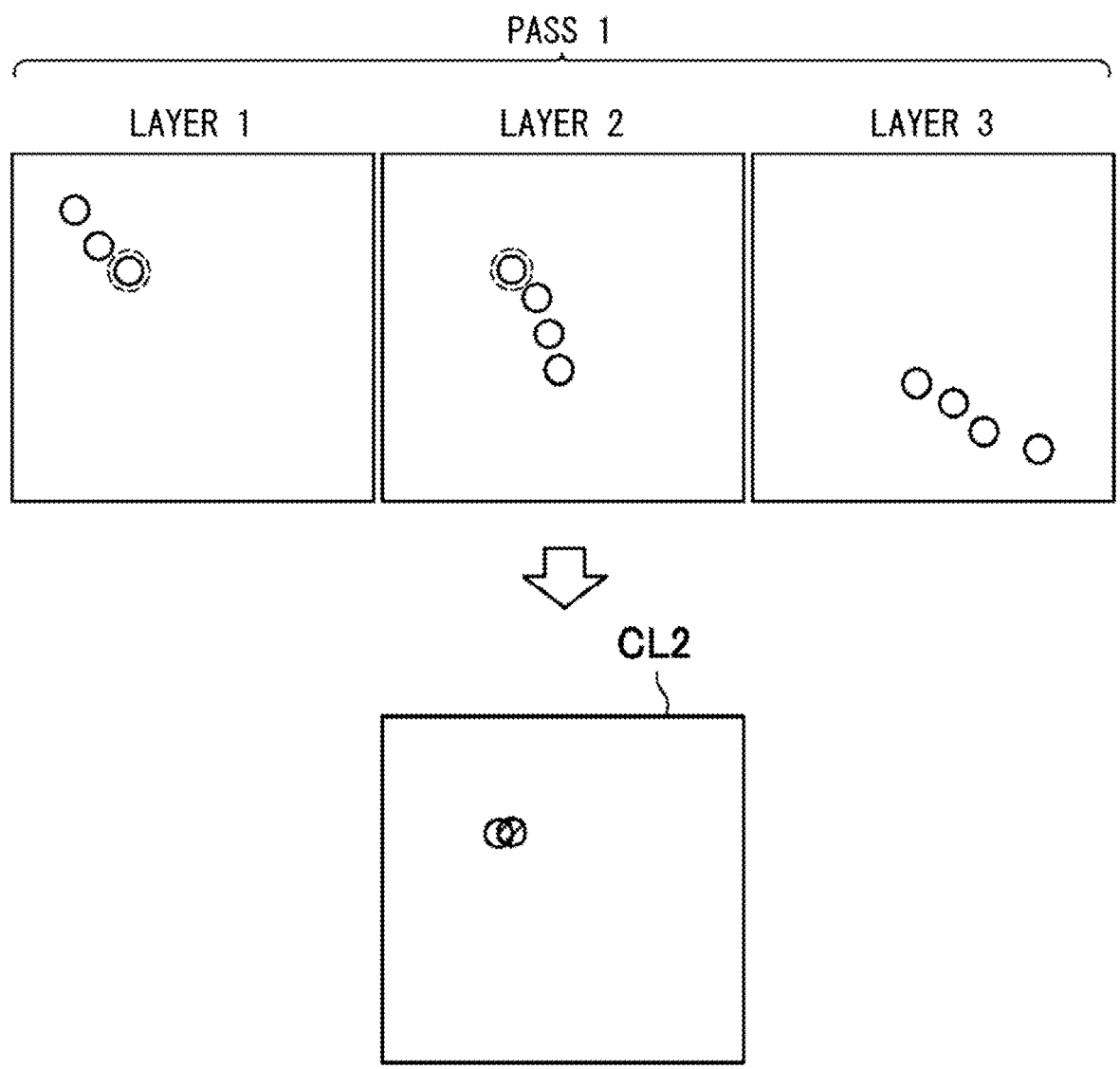
FIG. 15 is a schematic diagram for explaining a display image CL2 to display the centroid included in a lap Lw.

FIG. 15 is a schematic diagram for explaining a display image CL2 to display the centroid included in the lap Lw. The image processing unit 7 identifies the centroid having a Z coordinate included in the lap Lw based on the three-dimensional distribution information about each layer. In the example shown in FIG. 15, the centroid surrounded by broken lines in the layer 1 and layer 2 is identified as one included in the lap Lw.

The image processing unit 7 allocates white to the above-mentioned centroid in the layer 1 and allocates hatching to the above-mentioned centroid in the layer 2 to generate the display image CL2 and displays it on the display apparatus 44. Thereby, the degree of drifts of the objective lens 21 and stage 2 among layers can be further easily recognized.

Figure 16:
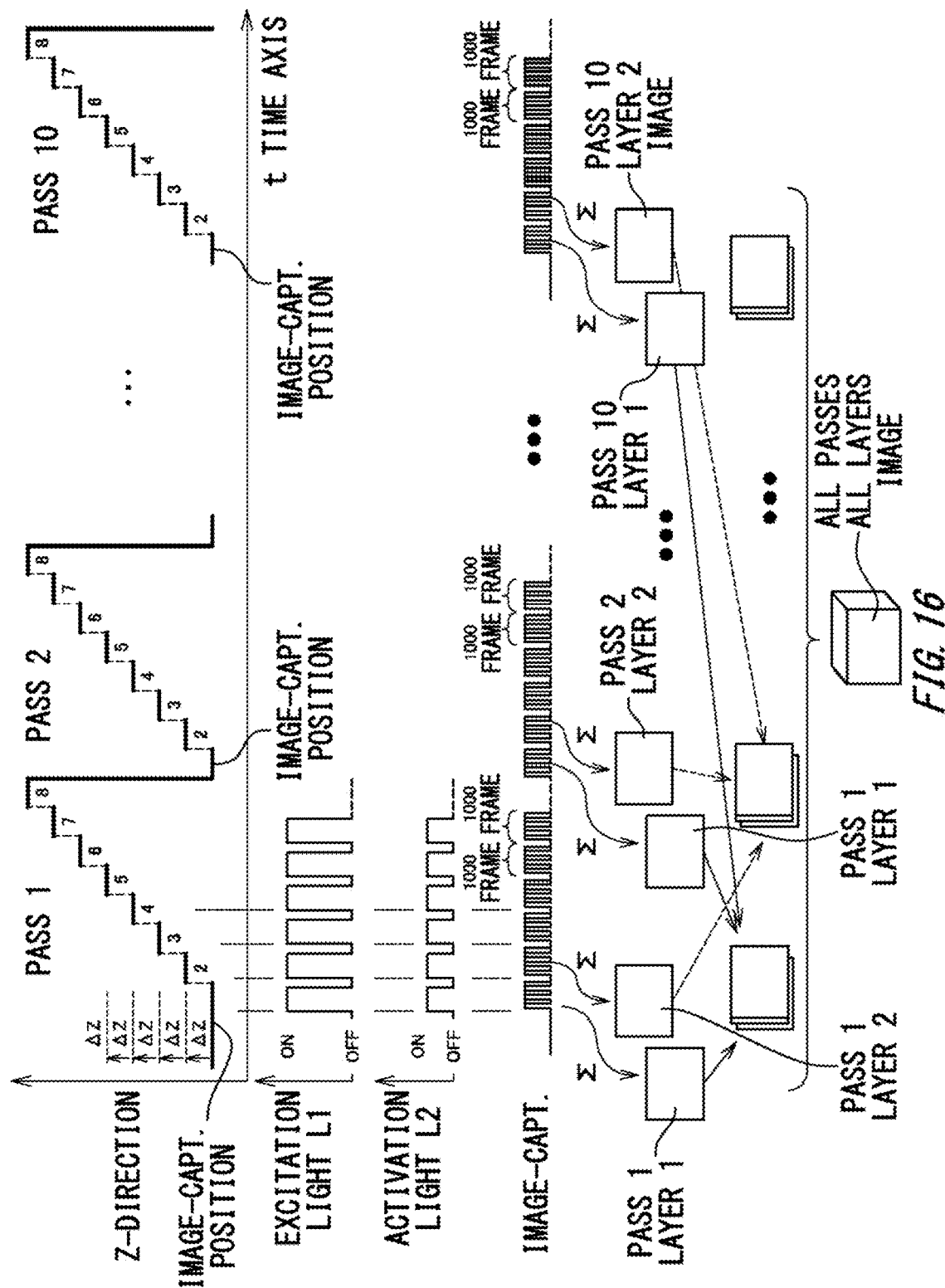
FIG. 16 is a schematic diagram of another sequence of actions performed by the microscope apparatus 1.

FIG. 16 is a schematic diagram of another sequence of actions performed by the microscope apparatus 1. FIG. 17 shows an example of a screen 110 on which image-capturing conditions in an image-capturing process corresponding to FIG. 16 are input.

In the example of FIG. 16, the microscope apparatus 1 repeats passing procedures multiple times. Specifically, passing procedures are repeated ten times starting at a passing procedure 1 and ending at a passing procedure 10.

The number of times of passing procedures is input by a user using the screen 110 of FIG. 17. Furthermore, similar to the screen 100 in FIG. 10, the screen 110 accepts inputs of the position of the lowermost plane for image-capturing, the position of the uppermost plane for image-capturing, the step size in the Z direction, the sequence of image-capturing in each passing procedure and the name of a file for storing three-dimensional distribution information. The screen 110 further accepts inputs of the entire number of frames to be used in each layer.

The image-capturing process in FIG. 16 and FIG. 17 may also be executed following the flowchart of FIG. 9. In this case, at Step S102, the entire number of frames input through the screen 110 is divided by the number of times of passing procedures to calculate the number of frames to be acquired at each image-capturing position in each passing procedure, that is, the number of frames in each unitary image-capturing process. For example if the number of frames to be used in all the passing procedures for each image-capturing position is 10000 in total, and the number of times of passing procedures is ten, the number of frames to be obtained at each image-capturing position becomes 1000. As in the example of FIG. 8 to FIG. 10, the number of frames may be different image-capturing position-by-image-capturing position.

Thereby, as shown in FIG. 16, the action of moving sequentially from the image-capturing position 1 to the image-capturing position 8 is assumed to be one passing procedure, and this action is repeated ten times. In other words, the image-capturing position moves to each image-capturing position a number of times of passing procedures, and frames corresponding to the above-mentioned unitary image-capturing process are captured at respective image-capturing positions.

Because in a microscope apparatus utilizing single-molecule localization microscopy such as STORM or PALM, as mentioned above, the number of image-capturing frames inevitably increases, if image-capturing is performed with the number of times of passing procedures being set to one, the color of a fluorescent material fades at latter image-capturing timing, and for example, the amounts of a fluorescent material may differ largely between a layer at the first image-capturing position and a layer at the final image-capturing position, in some cases.

Because according to the present embodiment, a plurality of passing procedures can be set, differences in the amounts of fluorescent materials among layers due to decoloration can be reduced, and differences in image quality among layers can be reduced.

Figure 18:
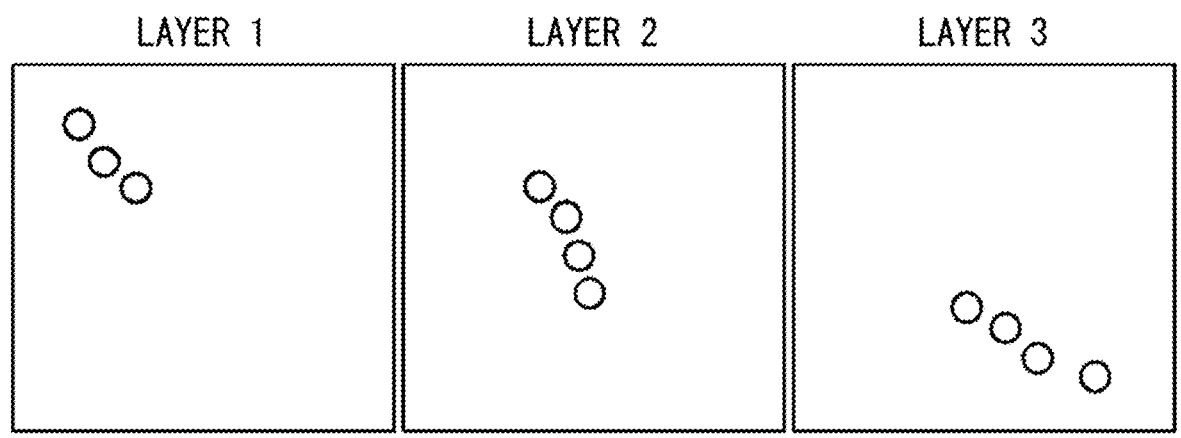
FIG. 18 is a schematic diagram showing three-dimensional distribution information about the centroid of fluorescence.
Figure 18:
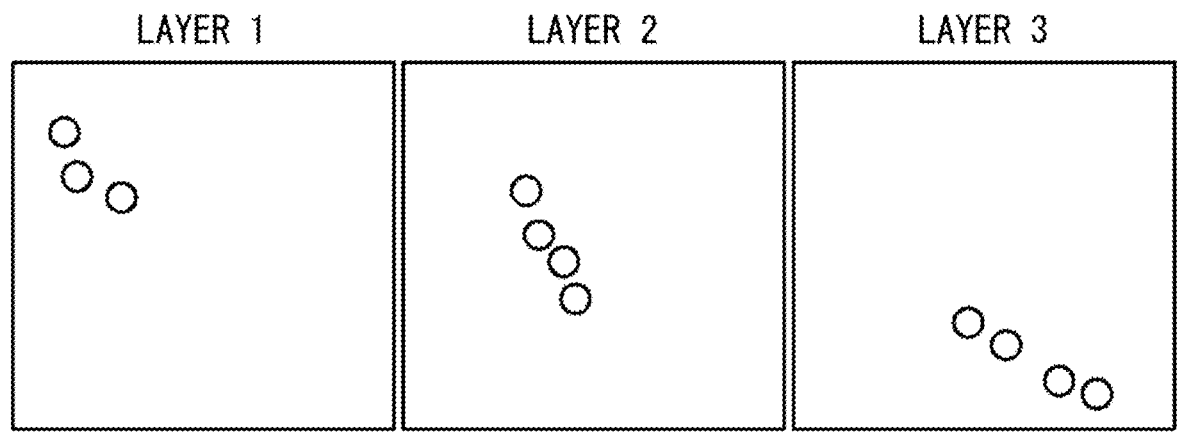

FIG. 18 is a schematic diagram showing a plurality of layers identified by image-capturing in a plurality of passing procedures and at a plurality of image-capturing positions. FIG. 18 shows the case where the number of layers is three and the number of times of passing procedures is two.

Figure 19:
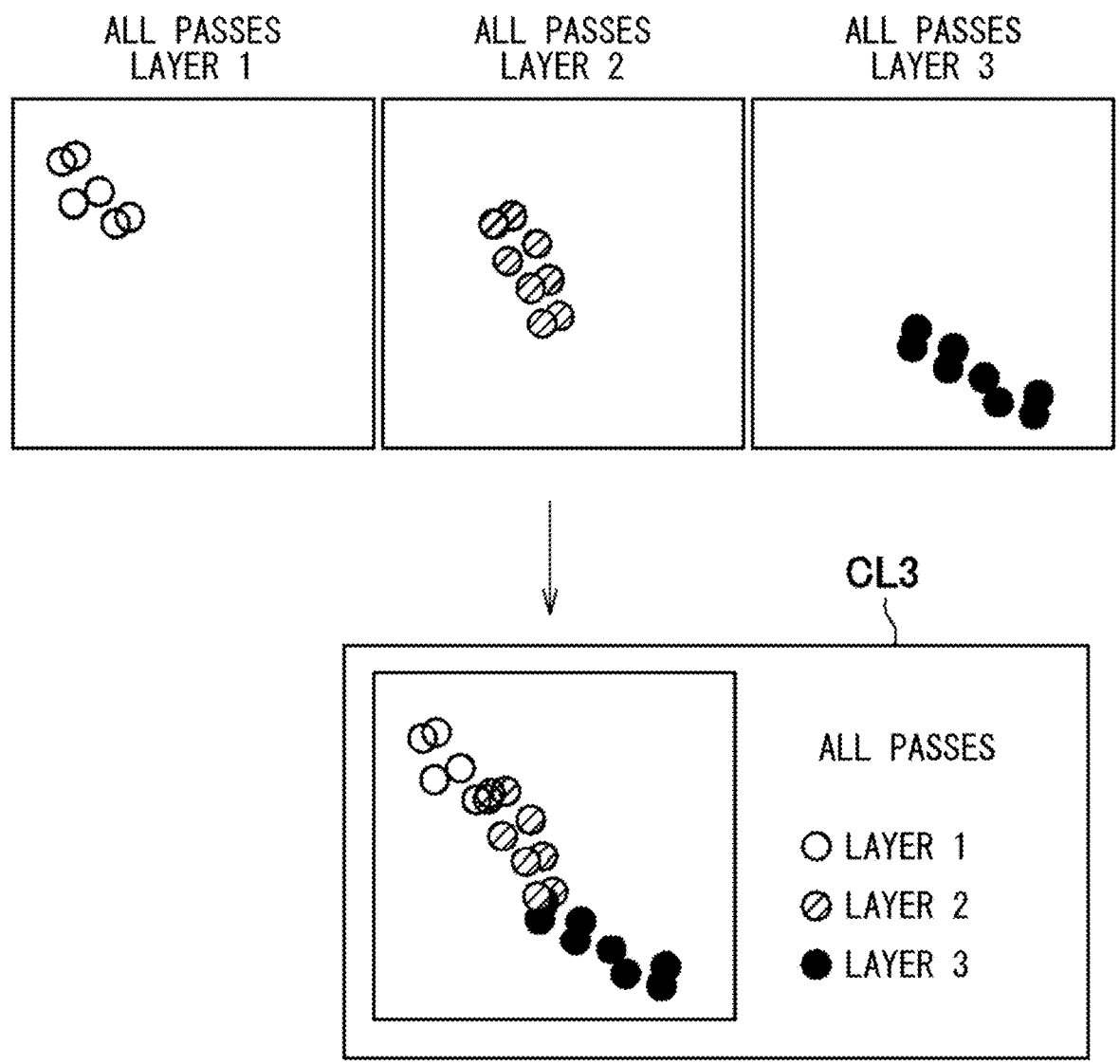
FIG. 19 shows a display image CL3 in which coloring is performed differently layer-by-layer.

FIG. 19 shows a display image CL3 in which coloring is performed differently layer-by-layer using the passing procedures in FIG. 18. However, for the same reason as that for FIG. 13, white, hatching and black are used instead of colors.

The image processing unit 7 accesses the XYZ positions of images of fluorescence stored in the storage apparatus 43, and allocates colors based at least on information identifying layers. The image processing unit 7 allocates white to images of fluorescence of the layer 1 included in all the passing procedures, allocates hatching to images of fluorescence of the layer 2 included in all the passing procedures, and allocates black to images of fluorescence of the layer 3 included in all the passing procedures to generate the display image CL3 and display it on the display apparatus 44. In this case, preferably, colors of the layer 1 to the layer 3 are indicated as a legend and additionally that passing procedure-by-passing procedure distinguishing is not done is indicated with a character string, "All Passing Procedures" or the like.

In this manner, because according to the present embodiment, the image processing unit 7 displays an image such that it is possible to visually distinguish which three-dimensional position has been identified based on an image-capturing result of which one among a plurality of layers, a user can easily recognize the degree of drifts (positional displacement) generated between the sample W and the objective lens generated due to differences in image-capturing timing among layers.

Figure 20:
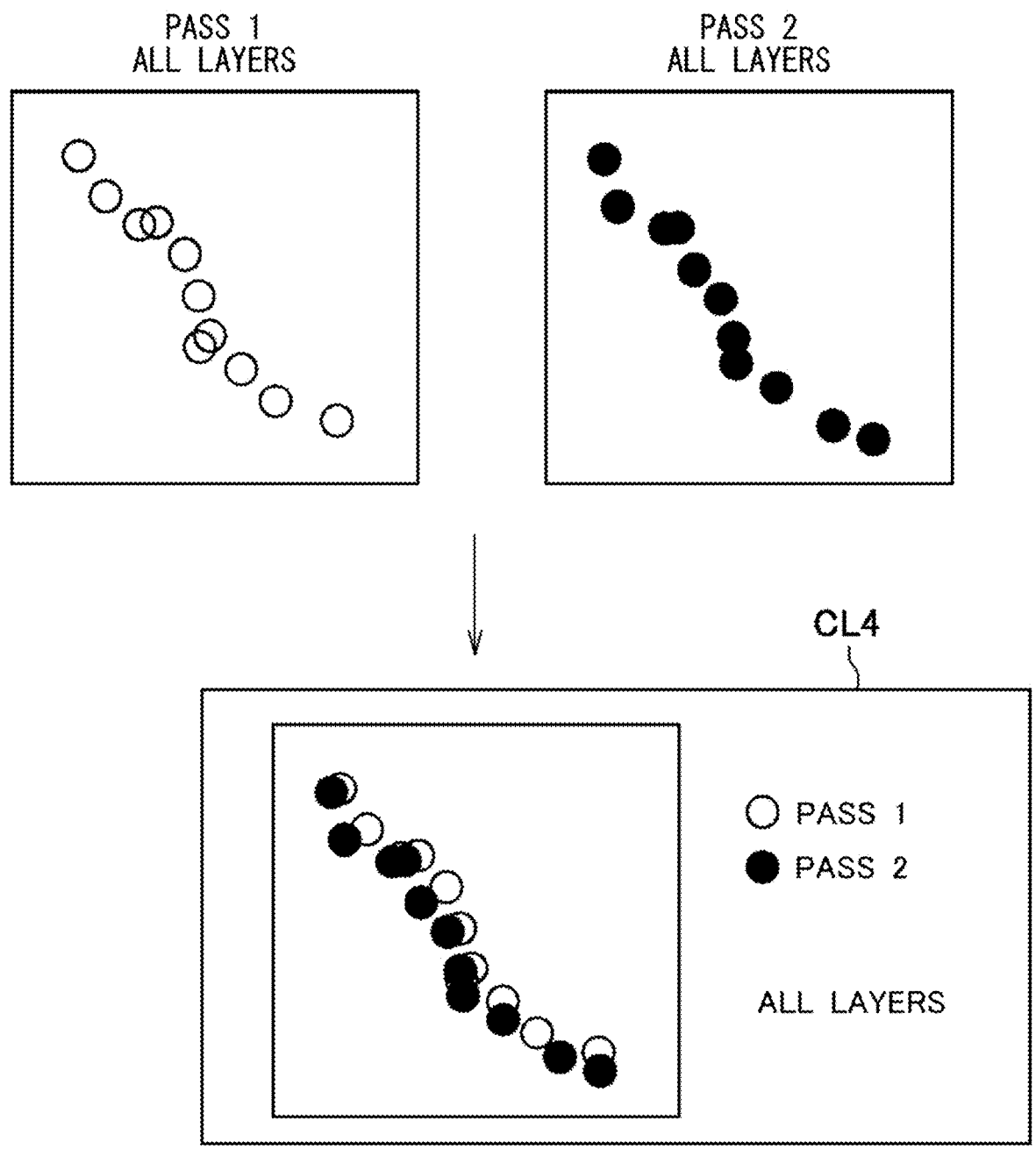
FIG. 20 shows a display image CL4 in which coloring is performed differently passing procedure-by-passing procedure.

FIG. 20 shows a display image CL4 in which coloring is performed differently passing procedure-by-passing procedure using the layers in FIG. 18. However, white and black are used instead of colors.

The image processing unit 7 accesses the XYZ positions of images of fluorescence stored in the storage apparatus 43, and allocates colors based at least on information identifying passing procedures. In the example of FIG. 12, the image processing unit 7 allocates white to images of fluorescence of all the layers included in the passing procedure 1 and allocates black to images of fluorescence of all the layers included in the passing procedure 2 to generate the display image CL4 and display it on the display apparatus 44. In such a case, preferably, the image processing unit 7 indicates the color of the passing procedure 1 and the color of the passing procedure 2 as a legend, and additionally that layer-by-layer distinguishing is not done is indicated with a character string, "All Layers" or the like.

In this manner, because according to the present embodiment, the image processing unit 7 displays an image such that it is possible to visually distinguish which three-dimensional position has been identified based on an image-capturing result of which one among a plurality of passing procedures, a user can easily recognize the degree of drifts of the sample W among passing procedures.

In addition, if a number of frames are entirely captured at each image-capturing position and then the image-capturing position moves to the next position, there is a concern that the degree of decoloration of fluorescence increases in temporally latter image-capturing positions and that sufficient image quality may not be attained. In contrast to this, because according to the embodiment using the sequence in FIG. 16, a number of frames used in each layer are distributed to a plurality of passing procedures and are captured, good image quality can be attained even at temporally latter image-capturing positions.

Although in FIG. 11, FIG. 15, and FIG. 18 to FIG. 20, three-dimensional distribution information is shown as an "image", this is for the purpose of explanation. That is, in other cases than the case where the display apparatus 44 is caused to display it as a "display image", the image processing unit 7 may not generate an image, but only has to treat it as data like the one shown in FIG. 7.

In the above-mentioned embodiment, the drive unit 50 moves the objective lens 21 in the optical axis-direction 5a to move the image-capturing position. Instead of this, the drive unit 50 may move the stage 2 in the optical axis-direction 5a of the objective lens 21 to move the image-capturing position.

In addition, if two types of fluorescent material are used, for example, in odd-numbered passing procedures among a plurality of passing procedures, excitation light at a wavelength to excite one of the fluorescent materials may be radiated and in even-numbered passing procedures among the plurality of passing procedures, excitation light at a wavelength to excite another fluorescent material may be radiated.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

1: microscope apparatus; 2: stage; 3: light source apparatus; 4: illumination optical system; 5: image forming optical system; 6: image-capturing unit; 7: image processing unit; 8: control apparatus; 10a: activation light source; 10b: excitation light source; 11a: shutter; 11b: shutter; 13: dichroic mirror; 14: acousto-optic element; 15: lens; 16: light-guiding member; 17: lens; 18: lens; 19: filter; 20: dichroic mirror; 21: objective lens; 24: filter; 25: lens; 26: optical path switching member; 28: lens; 29: filter unit; 30: observation optical system; 31: mirror; 32: lens; 33: mirror; 34: lens; 35: lens; 36: mirror; 37: lens; 40: image sensor; 41: control unit; 42: control unit; 43: storage apparatus; 44: display apparatus; 50: drive unit; 51 cover glass; 61: cylindrical lens; 100: screen; 110: screen; 150: screen; 152: region; 154: region; 156: box; 157: box; 158: box; 159 box

What is claimed is:

1. A microscope apparatus comprising:
an illumination optical system that radiates activation light to activate some of fluorescent materials included in a sample and excitation light to excite at least some of the activated fluorescent materials;
an image forming optical system that has an objective lens and an astigmatic optical system, which generates astigmatism to at least part of fluorescence from the fluorescent materials, and that forms an image of the fluorescence;
an image-capturing unit that captures an image formed by the image forming optical system;
a drive unit that moves an image-capturing position in the sample along an optical axis-direction of the objective lens; and
a control unit, wherein
the control unit causes the image-capturing unit to capture images in a plurality of numbers of frames respectively at a first image-capturing position and at a second image-capturing position different from the first image-capturing position along the optical axis-direction,
the control unit causes the image-capturing unit to capture images in a first number of frames at the first image-capturing position and capture images in a second number of frames different from the first number of frames at the second image-capturing position, and
the first number of frames and the second number of frames are identified by image-capturing conditions set before the control unit causes the image-capturing unit to capture images at the first and second image-capturing positions.

2. The microscope apparatus according to claim 1, wherein the drive unit moves the image-capturing position by moving at least one of (i) a stage holding the sample and (ii) the objective lens in the optical axis-direction of the objective lens.

3. The microscope apparatus according to claim 2,
wherein a distance between the second image-capturing position and a cover glass held by the stage is longer than a distance between the first image-capturing position and the cover glass, and
wherein the control unit controls the image-capturing unit so that the second number of frames for the second image-capturing position is larger than the first number of frames for the first image-capturing position.

4. The microscope apparatus according to claim 1, further comprising a display apparatus, wherein
the control unit:
generates a three-dimensional image at the first image-capturing position based on a result of image-capturing at the first image-capturing position obtained through the image-capturing in the first number of frames,
generates a three-dimensional image at the second image-capturing position based on a result of image-capturing at the second image-capturing position obtained through the image-capturing in the second number of frames, and
displays, on the display apparatus, the three-dimensional image captured at the first image-capturing position and the three-dimensional image captured at the second image-capturing position in different display colors.

5. The microscope apparatus according to claim 4, wherein the control unit causes to be displayed on the display apparatus only a specified region in the optical axis-direction of the objective lens.

6. The microscope apparatus according to claim 4, wherein the control unit causes to be displayed on the display apparatus only an overlapping region.

7. The microscope apparatus according to claim 4, wherein the three-dimensional images include three-dimensional position information about the fluorescent materials.

8. The microscope apparatus according to claim 1, wherein the control unit causes the image-capturing unit to perform multiple times an image-capturing action of capturing images at the first image-capturing position and of capturing images at the second image-capturing position.

9. The microscope apparatus according to claim 8, further comprising a display apparatus, wherein
the control unit:
generates a three-dimensional image at the first image-capturing position based on a result of image-capturing at the first image-capturing position obtained through the image-capturing action performed multiple times,
generates a three-dimensional image at the second image-capturing position based on a result of image-capturing at the second image-capturing position obtained through the image-capturing action performed multiple times, and
displays, on the display apparatus, the three-dimensional image captured at the first image-capturing position and the three-dimensional image captured at the second image-capturing position in different display colors.

10. The microscope apparatus according to claim 9, wherein
the control unit:
generates a three-dimensional image for each image-capturing action based on results of image-capturing at the first image-capturing position and the second image-capturing position obtained through each image-capturing action; and switches the display apparatus between (i) a first display mode in which the three-dimensional image captured at the first image-capturing position and the three-dimensional image captured at the second image-capturing position are displayed on the display apparatus in different display colors and (ii) a second display mode in which the three-dimensional image for each image-capturing action is displayed on the display apparatus in a different display color from those for three-dimensional images for other image-capturing actions.

11. The microscope apparatus according to claim 8, further comprising a display apparatus, wherein a three-dimensional image for each image-capturing action is generated based on results of image-capturing at the first image-capturing position and the second image-capturing position obtained through each image-capturing action, and the three-dimensional image for each image-capturing action is displayed on the display apparatus in a different display color from those for three-dimensional images for other image-capturing actions.

12. The microscope apparatus according to claim 1, wherein the control unit calculates three-dimensional position information about the fluorescent materials based on the astigmatism.

13. An image-capturing method performed at a microscope apparatus having:

an illumination optical system that radiates activation light to activate some of fluorescent materials included in a sample and excitation light to excite at least some of the activated fluorescent materials;

an image forming optical system that has an objective lens and an astigmatic optical system, which generates astigmatism to at least part of fluorescence from the fluorescent materials, and that forms an image of the fluorescence;

an image-capturing unit that captures an image formed by the image forming optical system; and a drive unit that moves an image-capturing position in the sample along an optical axis-direction of the objective lens, the image-capturing method comprising:

causing the image-capturing unit to capture images in a plurality of numbers of frames respectively at a first image-capturing position and at a second image-capturing position different from the first image-capturing position along the optical axis-direction such that images in a first number of frames at the first image-capturing position and images in a second number of frames different from the first number of frames at the second image-capturing position are captured, wherein the first number of frames and the second number of frames are identified by image-capturing conditions set before the image-capturing unit is caused to capture images at the first and second image-capturing positions.

14. A non-transitory computer-readable medium storing a computer program product having computer instructions that are executed by a computer to control a microscope apparatus having:

an illumination optical system that radiates activation light to activate some of fluorescent materials included in a sample and excitation light to excite at least some of the activated fluorescent materials;

an image forming optical system that has an objective lens and an astigmatic optical system, which generates astigmatism to at least part of fluorescence from the fluorescent materials, and that forms an image of the fluorescence;

an image-capturing unit that captures an image formed by the image forming optical system; and a drive unit that moves an image-capturing position in the sample along an optical axis-direction of the objective lens, the computer instructions, upon being executed by the computer, enabling the computer to perform operations comprising:

executing a procedure of causing the image-capturing unit to capture images in a plurality of numbers of frames respectively at a first image-capturing position and at a second image-capturing position different from the first image-capturing position along the optical axis-direction such that images in a first number of frames at the first image-capturing position and images in a second number of frames different from the first number of frames at the second image-capturing position are captured, wherein the first number of frames and the second number of frames are identified by image-capturing conditions set before the image-capturing unit is caused to capture images at the first and second image-capturing positions.

* * * * *